(12) United States Patent
Kück et al.

(10) Patent No.: US 8,373,961 B2
(45) Date of Patent: Feb. 12, 2013

(54) COUPLING FOR A FLUID LINE

(75) Inventors: Heinz Kück, Stuttgard (DE); André Bülau, Stuttgart (DE); Volker Mayer, Rechberghausen (DE); Marc Schober, Böblingen (DE); Martin Kurth, Kandern (DE)

(73) Assignee: A. Raymond et Cie, Grenoble (FR)

( * ) Notice: Subject to any disclaimer, the term of this patent is extended or adjusted under 35 U.S.C. 154(b) by 394 days.

(21) Appl. No.: 12/921,173

(22) PCT Filed: Feb. 18, 2009

(86) PCT No.: PCT/EP2009/001143
§ 371 (c)(1),
(2), (4) Date: Sep. 7, 2010

(87) PCT Pub. No.: WO2009/112144
PCT Pub. Date: Sep. 17, 2009

(65) Prior Publication Data
US 2011/0018254 A1 Jan. 27, 2011

(30) Foreign Application Priority Data

Mar. 13, 2008 (DE) .......... 10 2008 014 255
Dec. 5, 2008 (DE) .......... 20 2008 016 177 U

(51) Int. Cl.
*H01H 47/00* (2006.01)
(52) U.S. Cl. ............................................. 361/181
(58) Field of Classification Search .................. 361/181
See application file for complete search history.

(56) References Cited

U.S. PATENT DOCUMENTS

| 7,244,142 B2* | 7/2007 | Kato .................. 439/489 |
| 7,316,428 B2* | 1/2008 | Takayanagi et al. ......... 285/319 |
| 8,186,393 B2* | 5/2012 | Huegerich et al. ............ 141/294 |
| 2005/0063125 A1 | 3/2005 | Kato |
| 2007/0209716 A1 | 9/2007 | Rankin |

FOREIGN PATENT DOCUMENTS

DE 3914132 A1 1/1991

\* cited by examiner

*Primary Examiner* — Stephen W Jackson
(74) *Attorney, Agent, or Firm* — Faegre Baker Daniels

(57) ABSTRACT

The invention relates to a coupling for a fluid line, wherein an oscillating circuit (5, 9) is present for detecting a properly closed position of an inserted part (13). A tuning device (19) is further provided, by means of which the resonant frequency of the oscillating circuit (5, 9) can be influenced such that the resonant frequency corresponds to a characteristic closure frequency only in the closed position of the insertion part (13). The proper arrangement of the insertion part (13) in the closed position can thereby be detected without contact.

11 Claims, 28 Drawing Sheets

COUPLING FOR A FLUID LINE

CROSS-REFERENCE TO RELATED APPLICATION

This application is a U.S. National Phase Patent Application based on International Application Serial No. PCT/EP2009/001143 filed Feb. 18, 2009, the disclosure of which is hereby explicitly incorporated by reference herein.

BACKGROUND OF THE INVENTION

1. Field of the Invention

The present invention relates to a coupling for a fluid line.

2. Description of the Related Art

One known coupling for a fluid line is disclosed in US 2005/0063125 A1. The previously known coupling has an inserted part and a receiving part which is furnished for receiving and locking of the inserted part in a closed position. In addition an electric oscillating circuit connected to the receiving part is present, which in the closed position of the inserted part in the case of being supplied with electromagnetic energy is set up to oscillate with a specified resonant frequency corresponding to a characteristic closure frequency. In the closed position electric contacts of the oscillating circuit are closed for this purpose by corresponding influence of the inserted part in order to make possible an oscillation of the oscillating circuit. However, if the inserted part is not in the closed position in the case of the previously known coupling, the oscillating circuit is opened and cannot be excited to oscillation. Hence in the case of the supplying of the oscillating circuit with electromagnetic energy with an excitation frequency adapted to the resonant frequency the state of the coupling, that is, whether or not the inserted part is in the closed position, can be verified as a result of whether the oscillating circuit maximally attenuates an electromagnetic exciter field at its resonant frequency. Even if in the case of the previously known coupling it can be determined without a visual or haptic examination whether the inserted part is in the closed position or not, for corresponding reliable detection signals it is however necessary that the mechanical closing of the contacts takes place reliably.

SUMMARY OF THE INVENTION

The present invention provides a coupling for a fluid line in which an arrangement of the inserted part in the closed position can be detected regardless of a closing of electric contacts.

As a result of the fact that in the case of the inventive coupling for a fluid line the oscillating circuit is permanently closed and the resonant frequency of the oscillating circuit can be influenced via a contact-free tuning device cooperating with the oscillating circuit as well as mechanically with the inserted part to the effect that the oscillating circuit in the case of an arrangement of the inserted part in an intermediate position deviating from the closed position exhibits a resonant frequency deviating from the characteristic closure frequency, it can be determined on the basis of the frequency range of the maximum attenuation of an electromagnetic exciter field whether or not the inserted part is in the closed position.

In the case of one embodiment of the invention the tuning device acts on the capacity of the electric oscillating circuit.

In the case of another embodiment of the invention the tuning device acts on the inductivity of the electric oscillating circuit.

In the case of yet another embodiment of the invention the tuning device acts both on the capacity as well as on the inductivity of the electric oscillating circuit.

In the case of the embodiment types acting at least on the capacity, expediently a dielectric mechanically coupled to the inserted part is present which in the closed position escalates the capacity of the electric oscillating circuit vis-à-vis the capacity in the intermediate positions.

In the case of the embodiment types acting at least on the inductivity the tuning device has a permeability element coupled to the inserted part which in the closed position of the inserted part escalates the inductivity of the electric oscillating circuit vis-à-vis the intermediate positions.

Further expedient embodiments of the invention are the subject matter of the dependent claims.

In one form thereof, the present invention provides a coupling for a fluid line with an inserted part and with a receiving part, which is equipped for receiving and locking the inserted part in a closed position, wherein an electric oscillating circuit connected to the receiving part is present, which in the closed position of the inserted part in the case of supplying with electromagnetic energy for oscillation is equipped with a specific resonant frequency corresponding to a characteristic closure frequency, characterized in that the oscillating circuit is permanently closed and that a tuning device is present which cooperates with the oscillating circuit free of contact and with the inserted part mechanically in such a way that the oscillating circuit in the case of an intermediate position of the inserted part deviating from the closed position exhibits a resonant frequency deviating from the characteristic closure frequency and in the closed position exhibits the characteristic closure frequency.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
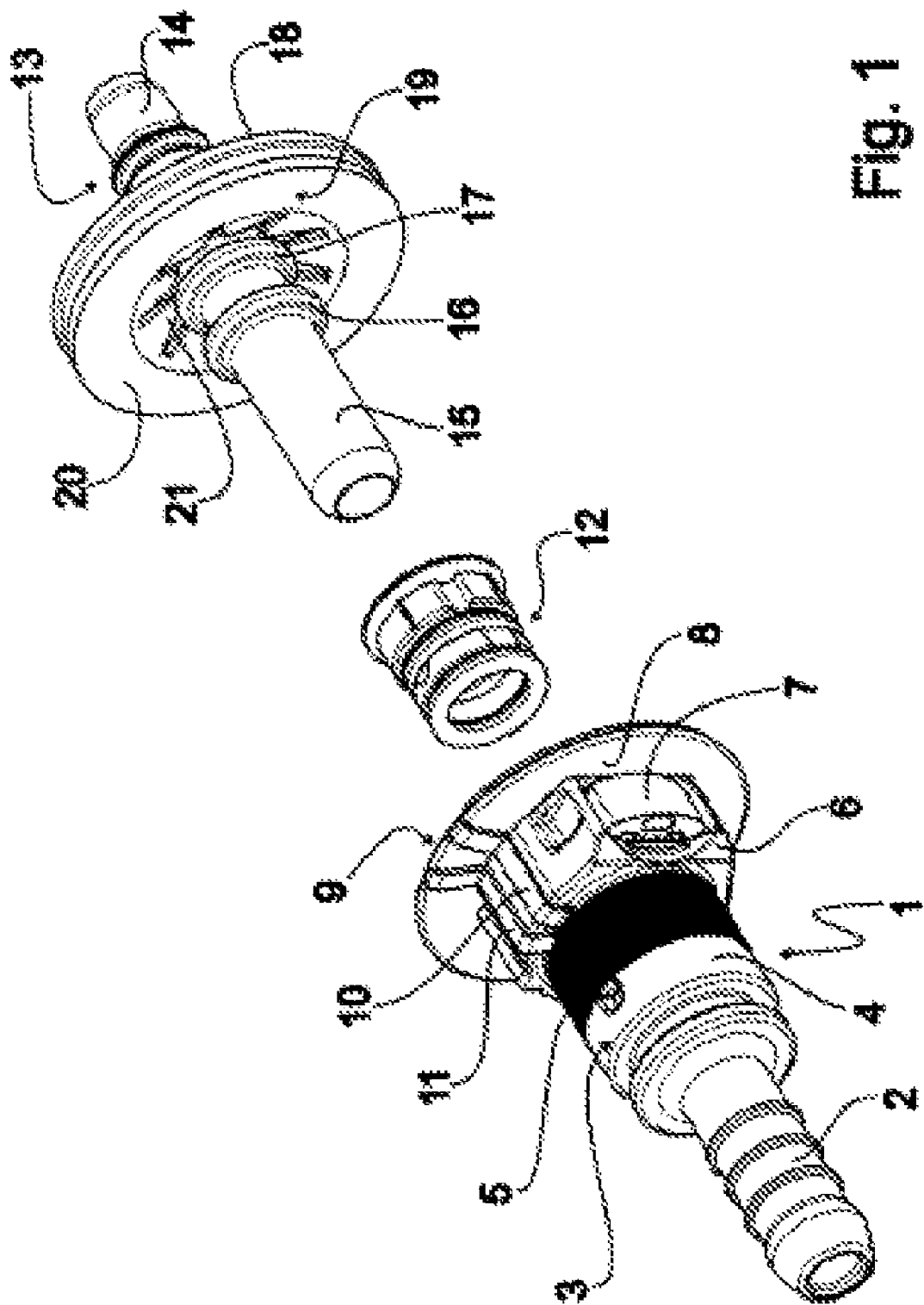
FIG. 1 shows a first exemplary embodiment of an inventive coupling with an inserted part and a receiving part in an exploded view in perspective.

Corresponding reference characters indicate corresponding parts throughout the several views. Although the exemplifications set out herein illustrate embodiments of the invention, in several forms, the embodiments disclosed below are not intended to be exhaustive or to be construed as limiting the scope of the invention to the precise forms disclosed.

DETAILED DESCRIPTION

FIG. 1 shows in an exploded view in perspective of a first exemplary embodiment of an inventive coupling for a fluid line not shown in FIG. 1. The exemplary embodiment according to FIG. 1 has an oblong receiving part 1 which is configured on a rear end for connection with one end of the fluid line to a connection nozzle 2. The receiving part 1 further exhibits a receiving section 3 that is larger in comparison to the connection nozzle 2, said receiving section exhibiting a cylindrical smooth winding wall 4 in its region adjoining the connection nozzle 2, upon which said winding wall coil 5 wound from a relatively thin coil wire is mounted as the inductance of an electric oscillating circuit.

On the end of the receiving section 3 averted from the connection nozzle 2 the receiving part 1 is configured with a retaining spring receiving body 6 further enlarged in comparison to the winding wall 4, said retaining spring receiving body being configured for the reception of an annular closed retaining spring 7. In addition the receiving part 1 is configured on its front-side end averted from the connection nozzle 2 with a capacitor carrier plate 8 protruding radially outward, upon whose front side averted from the receiving section 3 ring electrodes of a capacitor 9 forming the capacity of the oscillating circuit are arranged. In the case of the first exemplary embodiment according to FIG. 1 the capacitor 9 has two ring electrodes which are each connected to one connection end of the coil 5 via a first connection cable 10 or via a second connection cable 11.

In addition the inventive coupling according to the first exemplary embodiment of FIG. 1 has a sealing unit 12 which can be inserted into the receiving section 3 of the receiving part 1.

The coupling according to the exemplary embodiment of FIG. 1 comprise in addition an oblong inserted part 13 which is configured on a rear-side end with a connection nozzle 14 for connection to a further end of the fluid line not shown in FIG. 1. On the region of the inserted part 13 opposite the connection nozzle 14 an insertion shaft 15 with a smooth cylindrical exterior wall is configured, whose length corresponds approximately to the length of the receiving section 3 of the receiving part 1. In addition the insertion part 13 is configured with a rotary locking collar 16 radially projecting over the insertion shaft 15, said locking collar being arranged at a distance from the free end of the insertion shaft 15. In addition between the locking collar 16 and the connection nozzle 14 an annular rotary retaining collar 17 likewise radially projecting over the insertion shaft 15 is configured, which is arranged at a distance from a counter-plate 18, which is arranged on the side of the retaining collar 17 averted from the locking collar 16. The counter plate exhibits in radial direction dimensions which correspond essentially to the corresponding dimensions of the capacitor carrier plate 8.

The inventive coupling according to the first exemplary embodiment shown in FIG. 1 is additionally configured with a dielectric carrier disk 19 as the element of a tuning device, which exhibits in radial direction dimensions which correspond essentially to the corresponding dimensions of the counter plate 18 and which exhibits a relatively high dielectricity constant. The dielectric carrier disk 19 is configured with an annular flat side 20 lying radially outward. In addition the dielectric carrier disk 19 has inner pre-stress tongues 21 placed on the radial interior of the flat side 20, said pre-stress tongues being arranged between the retaining collar 17 and the counter-plate 18 in the arrangement according to FIG. 1.

Figure 2:
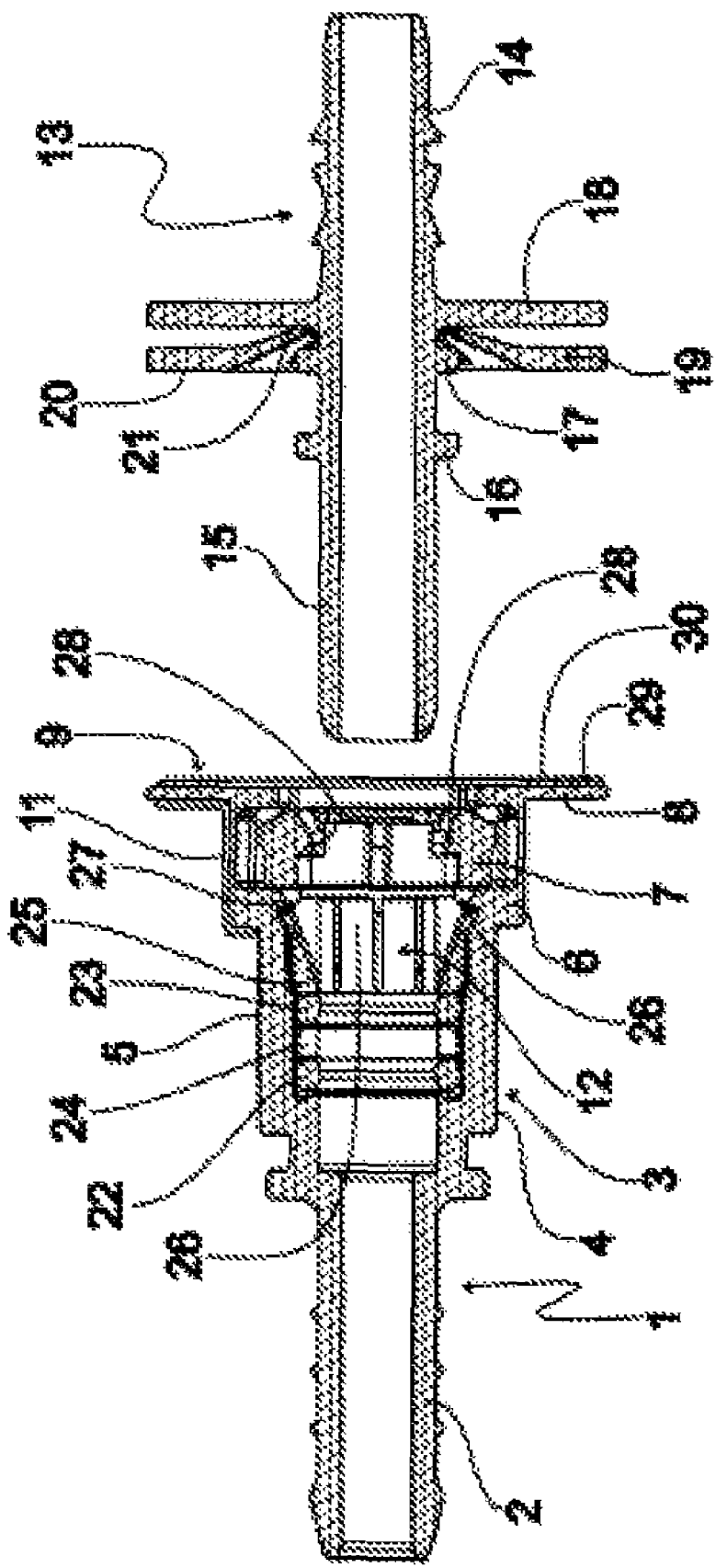
FIG. 2 shows the exemplary embodiment according to FIG. 1 in a longitudinal section in an opened position.

FIG. 2 shows in a longitudinal section the first exemplary embodiment according to FIG. 1 with a sealing unit 12 inserted into the receiving section 3 of the receiving part as well as with an insertion part 13 in an intermediate position, here at a greater distance from the receiving part 1. From FIG. 2 it can be seen that the sealing unit has a first sealing ring 22, a second sealing ring 23, an intermediate ring 24 arranged between the first sealing ring 22 and the second sealing ring 23 as well as a locking ring 25 with a number of outward elastic locking arms 26, which engage a radially inward protruding safety collar 27 configured in the receiving section 3 in order to fix the sealing rings 22, 23 as well as the intermediate ring 24 in the receiving part.

In addition it can be inferred from the representation of FIG. 2 that the retaining spring 7 has a number of radial inwardly protruding rear snap-on tongues 28 which are equipped for the engagement of the locking collar 16 configured on the insertion part 13.

On the capacitor carrier plate 8 in the case of the exemplary embodiment according to FIG. 1 an outer, annular configured capacitor ring electrode 29 and as the second ring electrode an inner capacitor ring electrode 30 lying concentrically in radial direction within the outer capacitor ring elector 29 are arranged for the configuration of the capacitor 9. The capacitor ring electrodes 19, 30 lie on one plane.

As can be seen from FIG. 2, the dielectricum carrier disk 19 is retained captive by the engagement of the pre-stress tongues 21 in the intermediate space configured between the retaining collar 17 and the counter plate 18.

Figure 3:
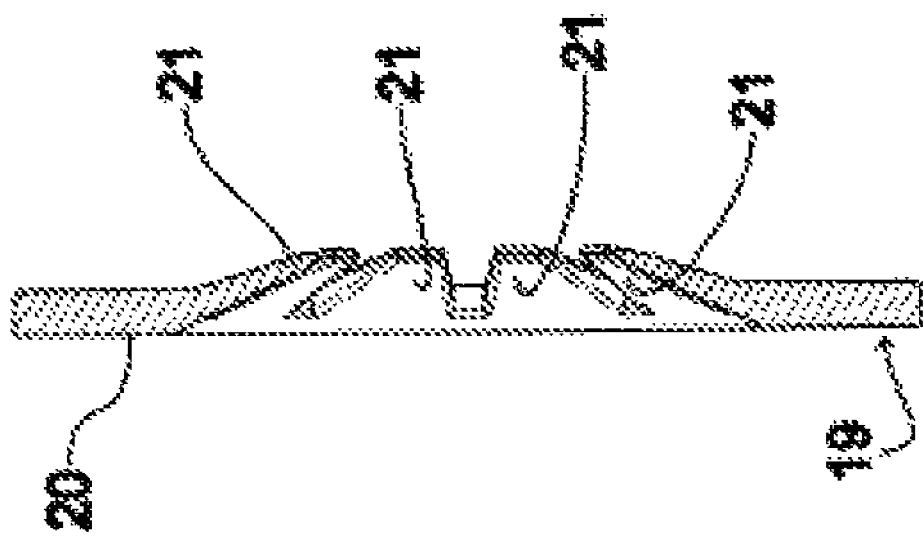
FIG. 3 shows a dielectric carrier disk of the exemplary embodiment according to FIG. 1 in a lateral view.

FIG. 3 shows the dielectric carrier disk 19 in a sectional view in diameter. From FIG. 3 it can be recognized that the pre-stress tongues 21 run radially inward opposite the flat side 20 offset and pointing away from the flat side 20. The bending stiffness of the pre-stress tongues 21 is equipped in such a way that in the case of slipping the dielectric carrier disk 19 onto the receiving part 1 they exceed in a fixation of the dielectric carrier disk 19 the retaining collar 17 arranged to a great extent free from play at not too great a distance from the counter plate 18 and engage into the intermediate space configured between the retaining collar 17 as well as the counter plate 187.

Figure 4:
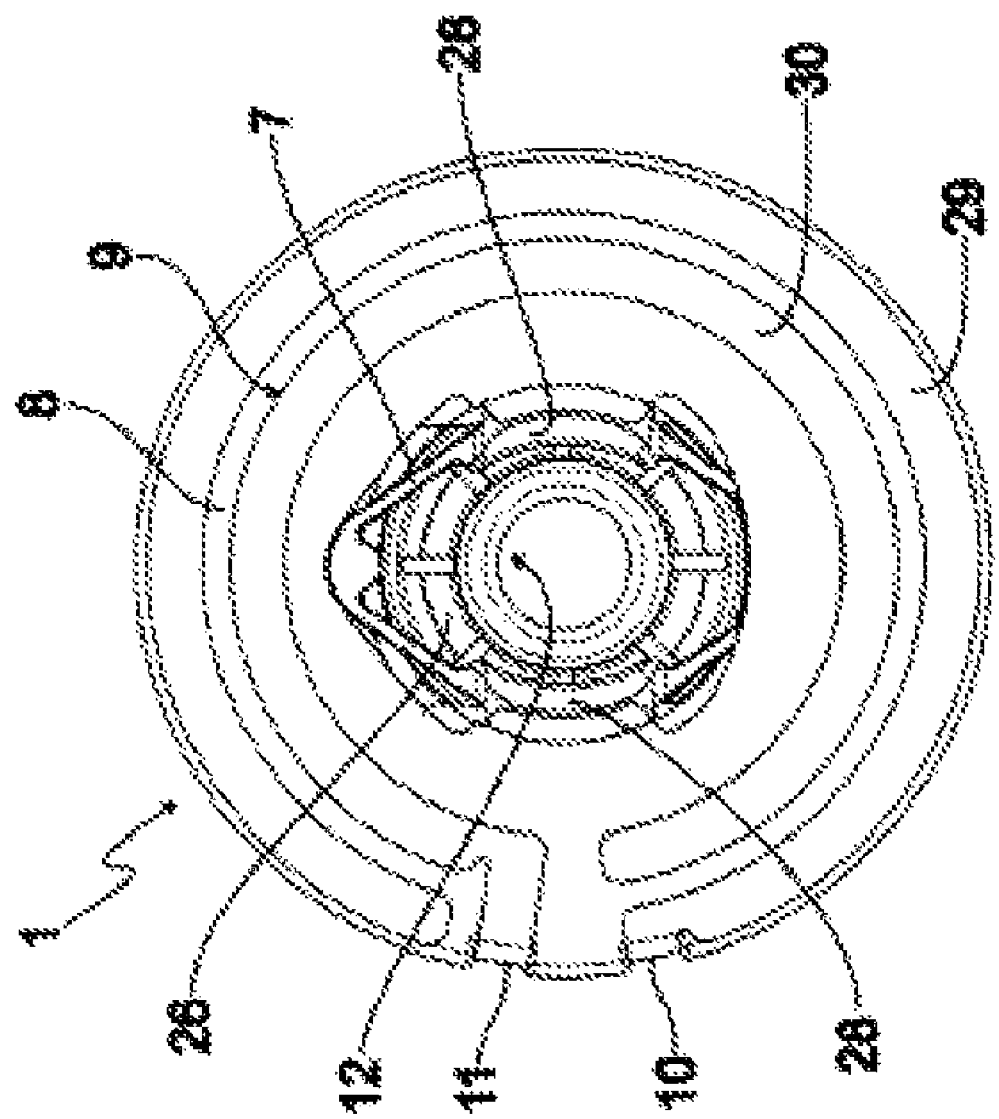
FIG. 4 shows a front view of the receiving part of the exemplary embodiment according to FIG. 1.

FIG. 4 shows the receiving part 1 in a front view on the capacitor carrier plate 8 and the capacitor mounted on said capacitor carrier plate. From the representation according to FIG. 4 it is evident that the outer capacitor ring electrode 29 extends from the first connection cable 10 in the form of a ring at the outer border of the capacitor carrier plate 8 and ends at a distance from the first connection cable 10. The inner capacitor ring electrode 30, which is connected to the second connection cable 11 lying between the first connection cable 10 and the end of the outer capacitor ring electrode 29, extends radially on the inside of the outer capacitor ring electrode 29 and likewise ends at a distance from the connection cable 11, to which it is connected. Hence in the case of the contact of a voltage between the capacitor ring electrodes 29, 30 lying on a plane an electric field is configured which extends from the plane of the capacitor carrier plate 8 and in particular protrudes with field components above the front of the capacitor carrier plate 8. Due to the inhomogeneity of the electric field configured in the case of the contact of an electric voltage between the capacitor ring electrodes 29, 30 in longitudinal direction the field density increases disproportionately in the case of the approach to the capacitor 9.

Figure 5:
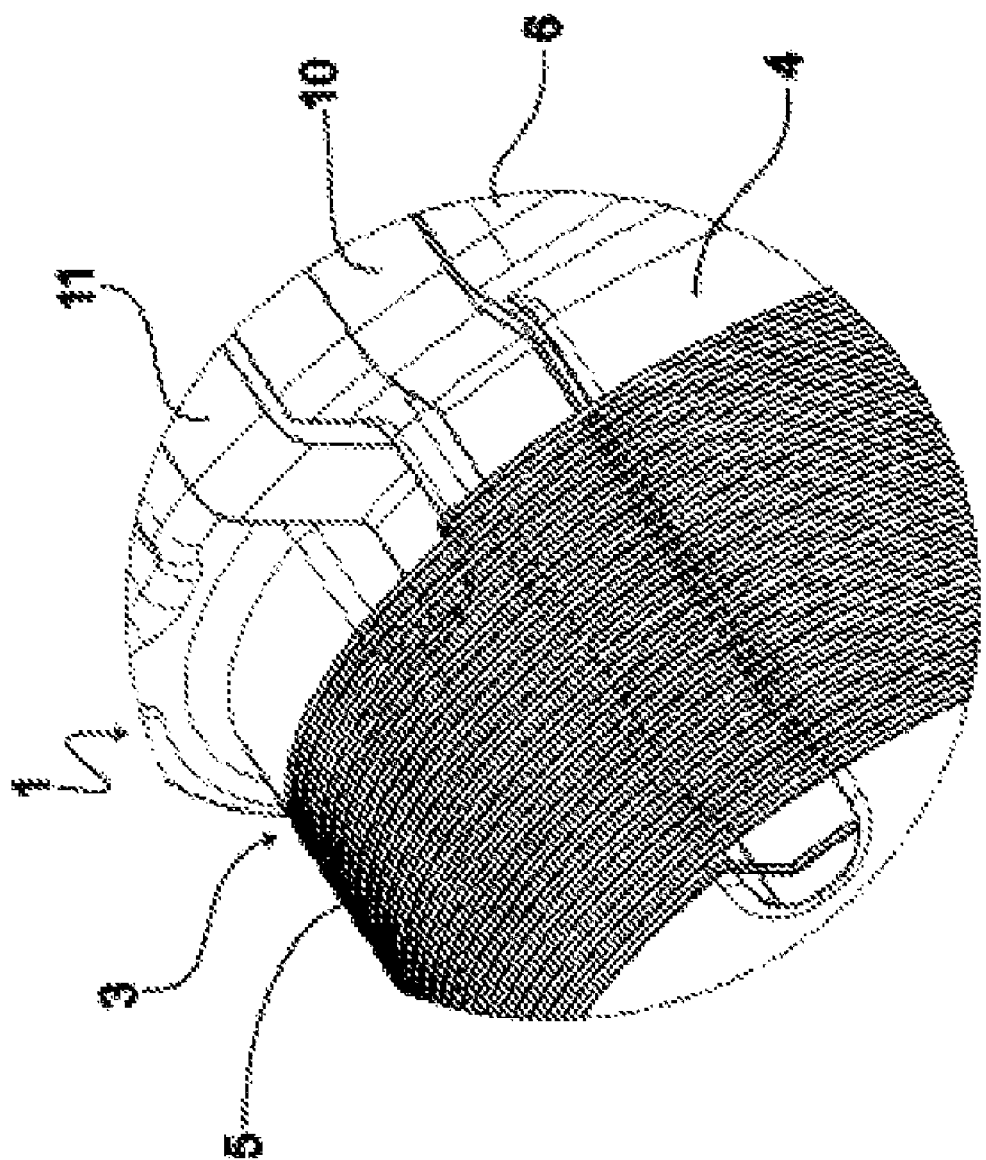
FIG. 5 shows the connection of a coil in a detailed representation in perspective in the case of the exemplary embodiment according to FIG. 1.

FIG. 5 shows in a detailed view in perspective the coil 5 as well as the connection cables 10, 11 in the transition region between the winding wall 4 and the retaining spring receiving body 6. From FIG. 5 it is evident that the connection cables 10, 11 are arranged in the recesses configured in the receiving section 3 and are each in contact with one end of the coil 5 consisting of a plurality of windings. Hence the coil 5 and the capacitor 9 form a permanently closed electric oscillating circuit.

Figure 6:
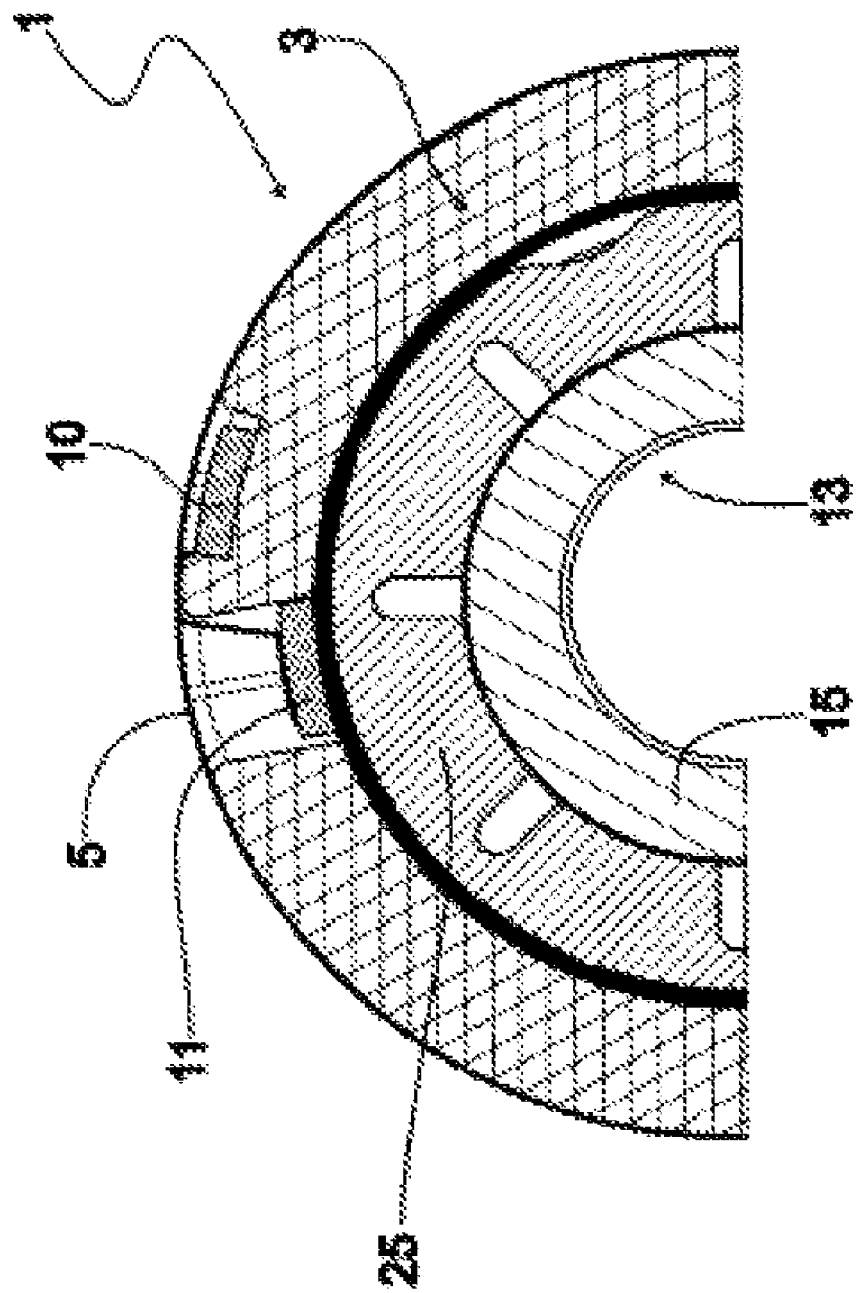
FIG. 6 shows in a cutout sectional view the arrangement of connection cables in the receiving part in the case of the embodiment according to FIG. 1.

FIG. 6 shows a cross-section through the receiving part 1 in the region of the coil 5 as well as of the ends of the connection cables 10, 11 connected to the coil 5 with a view in the direction of the locking ring 25, wherein in the representation according to FIG. 6 the insertion shaft 15 of the inserted part 13 is arranged in the receiving section 3. From FIG. 6 it is evident that the connection cables 10, 11 are arranged at a radial distance from the coil 5, in order to safely exclude a contact of the coil 5, and to simplify the electric connection between the ends of the coil 5 as well as between the connection cables in an automated procedure.

Figure 7:
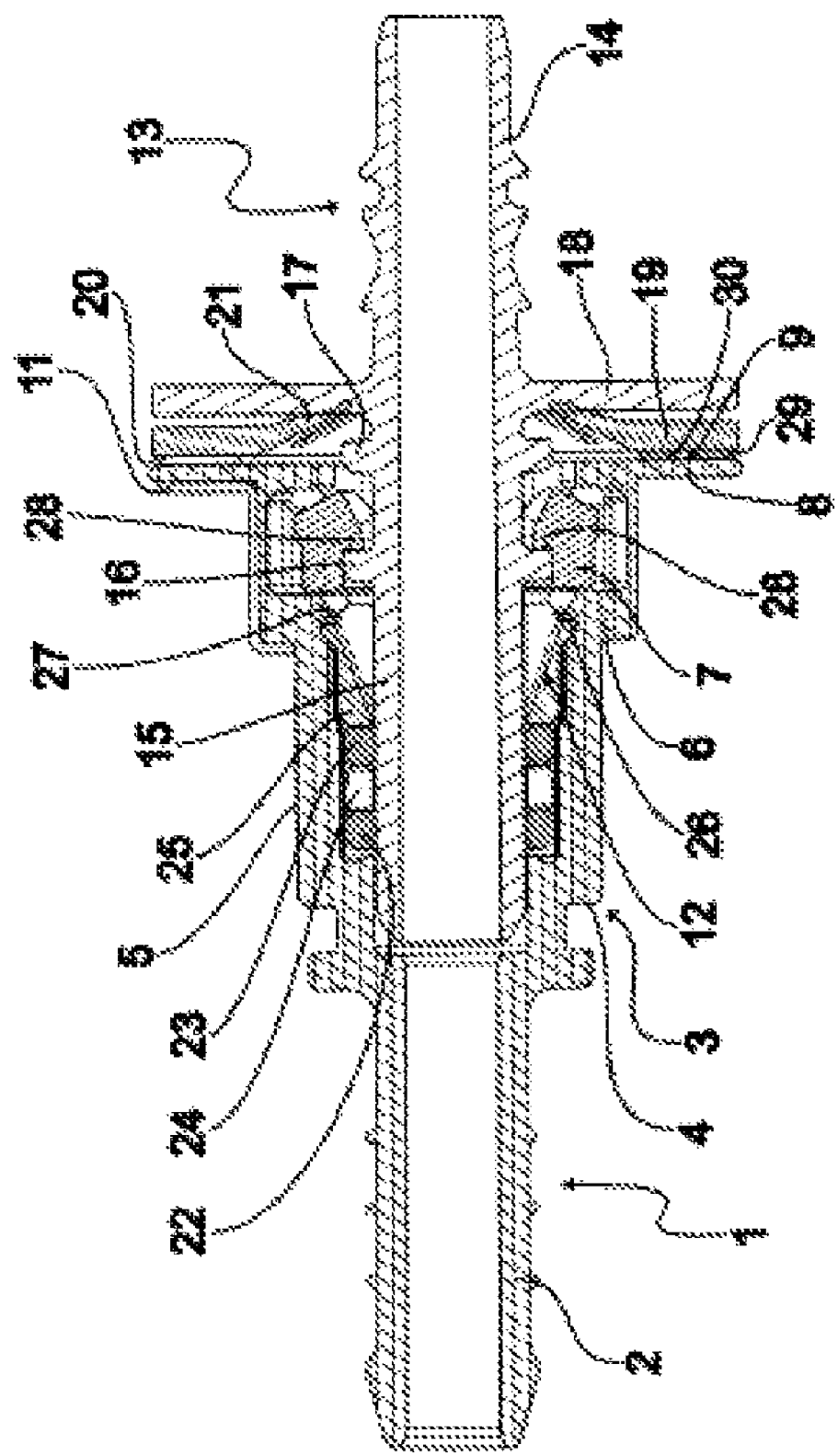
FIG. 7 shows in a longitudinal section the exemplary embodiment according to FIG. 1 with the inserted part in the closed position.

FIG. 7 shows in a longitudinal section the first exemplary embodiment of an inventive coupling according to FIG. 1 in an arrangement in which the inserted part 13 is arranged in a closed position in the receiving part 1 and is fixed by means of engagement of the locking collar 16 through the rear snap-on tongues 28 of the retaining spring 7. In the closed position which is occupied by means of overrunning of the rear snap-on tongues 28 through the locking collar 16 including a crossing required for a reliable rear catching, the dielectric carrier disk 19 is with its flat side 20 with a pre-stressing generated by the pre-stress tongues 21 flush with the capacitor ring electrodes 29, 30 of the capacitor 9, so that its capacity escalates by means of the introduction of a dielectric into the inhomogeneous electric field configured between the capacitor ring electrodes 29, 30 in longitudinal direction in comparison to the capacity in an intermediate position of the inserted part 13 in which the dielectric carrier disk 19 exhibits a distance from the capacitor electrodes 29, 30.

In the process the dimensions and the material properties of the pre-stress tongues 21 as well as the distance between the engagement side of the locking collar 16 turned toward the counter plate 18 and the support side of the counter plate 18 turned toward the locking collar 16 are equipped such that in the closed position the dielectric carrier disk 19 within the scope of the tolerances standard for production is pressed with a lower minimum pressing force up to the capacitor ring electrodes 19, 20 in order in the case of a relatively slightly spaced intermediate position of the inserted part 13 from the closed position to likewise create a distance between the flat side 20 of the dielectric carrier disk 19 and the capacitor ring electrodes 29, 30, which in comparison to a contact that is free of air gaps leads to a sharply lower capacity of the capacitor 9. As a result in the closed position of the inserted part 13 of the capacity of the capacitor 9 is the maximum, and the resonant frequency of the electric oscillating circuit is tuned to the characteristic closure frequency.

Figure 8:
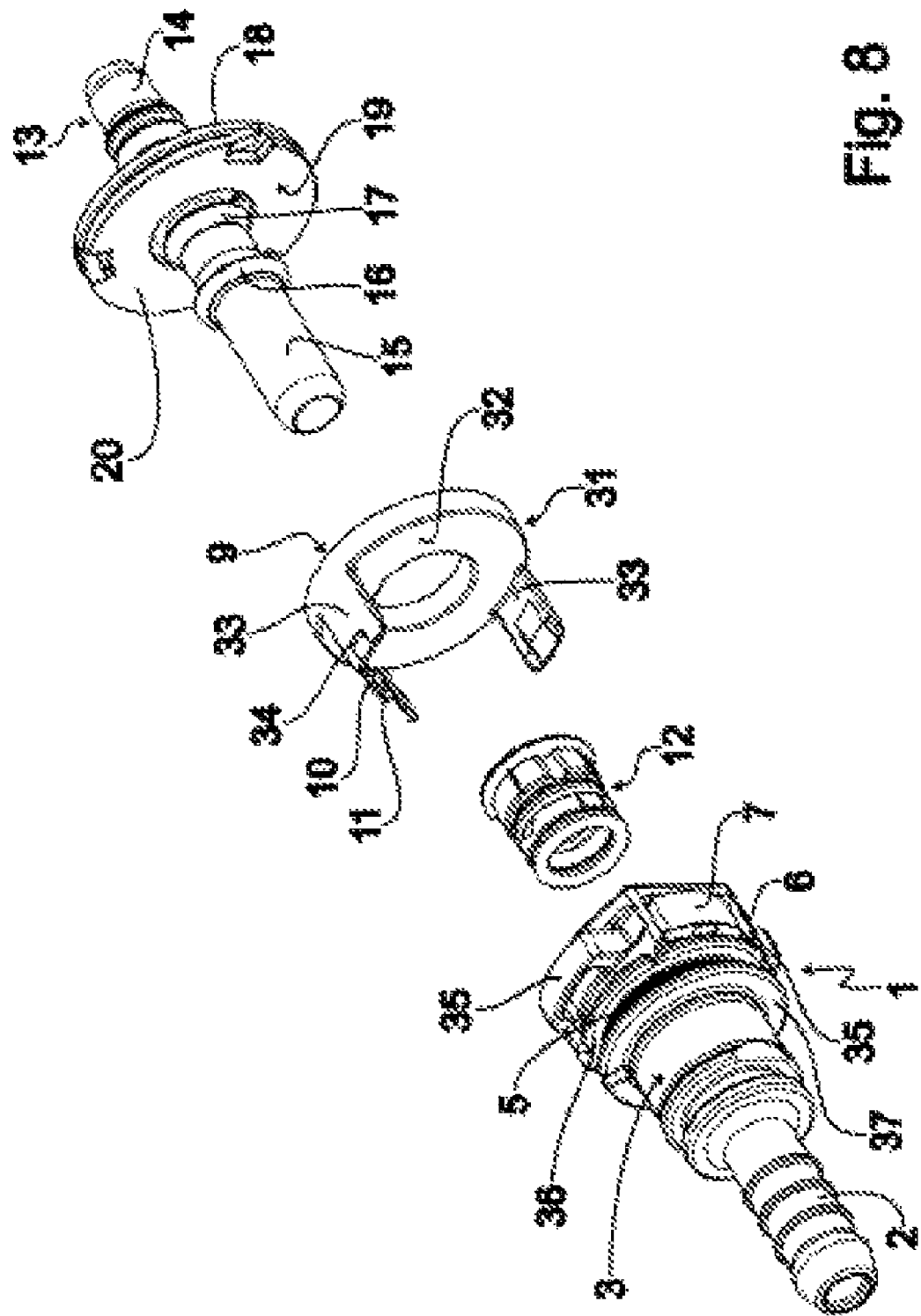
FIG. 8 shows in an exploded view in perspective a second exemplary embodiment of an inventive coupling with an inserted part, with a receiving part and with a capacitor holder as a separate component which can be connected to the receiving part.

FIG. 8 shows in an exploded view in perspective a second exemplary embodiment of an inventive coupling for a fluid line not shown in FIG. 2. In the process it is noted that in the case of the first exemplary embodiment according to FIG. 1 through FIG. 7 and in the case of the second exemplary embodiment matching elements are provided with the same reference numerals and in the following will not be more closely described to avoid repetition. The exemplary embodiment according to FIG. 8 has a capacitor holder 31 as a separate component, which is configured with a flat ring disk 32 which has a central recess for the guiding through of the insertion shaft 15 of the receiving part 13 and on a flat side oriented at a right angle to the longitudinal direction of the coupling is occupied with the capacitor 9 of an electric oscillating circuit.

On the side averted from the capacitor 9 two diametrically opposed slide-in tongues 33 are molded on, on whose free ends averted from the ring disk 32 a radially outwardly protruding locking nose 34 is configured. In addition it can be inferred from FIG. 8 that on the retaining spring receiving body 6 of the receiving part 1 two diametrically opposed retaining brackets 35 are present which in bridge-like manner project radially outward above the retaining spring receiving body 6 and are dimensioned such that they enclose the slide-in tongues 33 in a flush manner in the case of the attachment of the capacitor holder 31 to the receiving part.

In addition in the case of the second exemplary embodiment according to FIG. 8 the coil 5 is wound up in a receiving groove bounded by two border collars 36, 37, said receiving groove being arranged adjacent to the retaining spring receiving body 6.

Figure 9:
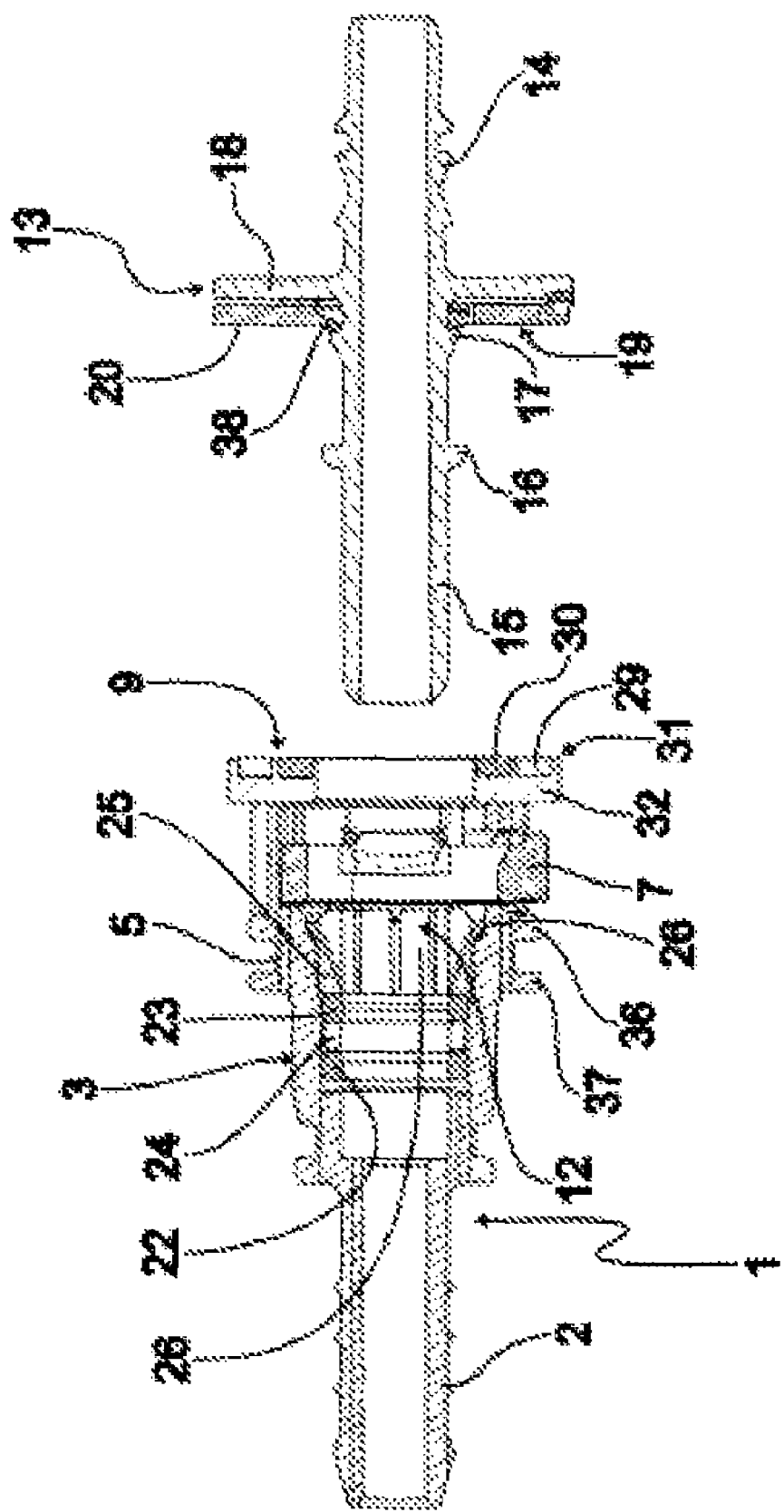
FIG. 9 shows in a longitudinal section the exemplary embodiment according to FIG. 8 with a capacitor holder mounted on the receiving part.

FIG. 9 shows in a longitudinal section the exemplary embodiment according to FIG. 8 with a capacitor holder 31 attached to the receiving part 1. In the case of the second exemplary embodiment the capacitor ring electrodes 29, 30 in longitudinal direction of the coupling are rather massively designed and embedded in electrode receiving grooves configured corresponding to the capacitor ring electrodes 29, 30. As a result the capacitor 9 is very resistant vis-à-vis mechanical loads.

In addition it can be inferred from the representation according to FIG. 9 that in the case of the second exemplary embodiment the dielectric carrier disk 19 is configured with relatively rigid counter-pressure tongues 38, which in the case of arrangement of the dielectric carrier disk 19 in accordance with regulations according to the second exemplary embodiment are oriented pointing away from the counter plate 18 and abut the rear snap-on side of the retaining collar 17 turned toward the counter plate 18. As a result the dielectric carrier disk 19 is firmly connected to the inserted part 13 until the application of force which as a rule proves to be destructive.

Figure 10:
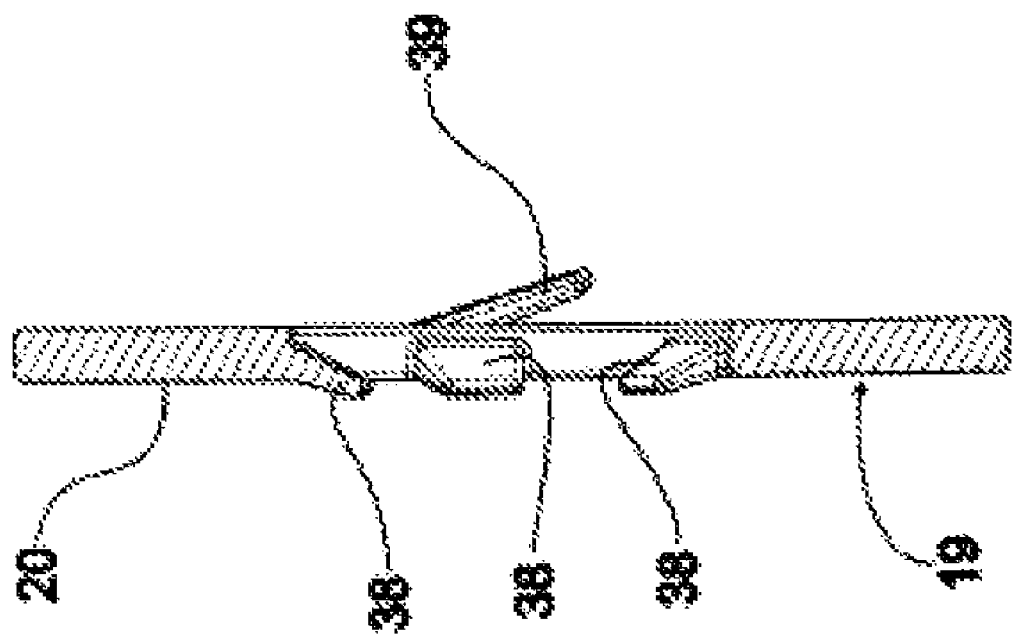
FIG. 10 shows in a section the dielectric carrier disk of the exemplary embodiment according to FIG. 8.

FIG. 10 shows in a cross-section the dielectric carrier disk 19 of the second exemplary embodiment according to FIG. 8. The dielectric carrier disk 19 has in the case of the second exemplary embodiment a number of outer pre-stress tongues 39 radially arranged and pointing in the direction away from the counter-pressure tongues 38.

Figure 11:
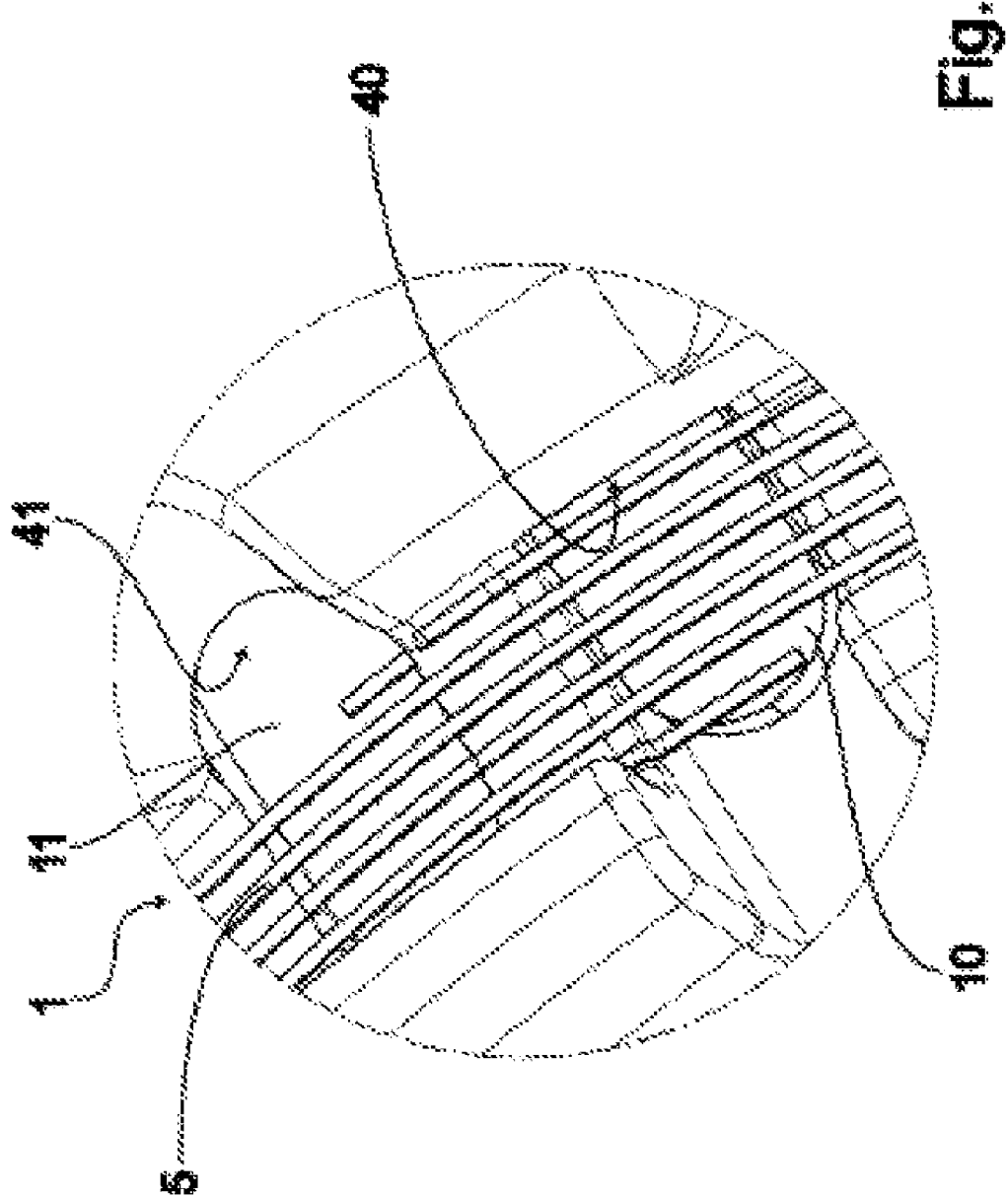
FIG. 11 shows in a detailed view in perspective the connection of the coil in the case of the exemplary embodiment according to FIG. 8.

FIG. 11 shows in an enlarged perspective detailed view the receiving part 1 of the second exemplary embodiment in the region of the border collars 36, 37 with the line ends of the coil 5. From FIG. 11 it is evident that the connection cables 10, 11 each enter through a line recess 40, 41 configured in the retaining spring receiving body 6 and end radially on the inside of the coil 5. Each line end of the coil 5 is connected to a connection cable 10, 11 for the establishment of a permanently closed electric oscillating circuit.

Figure 12:
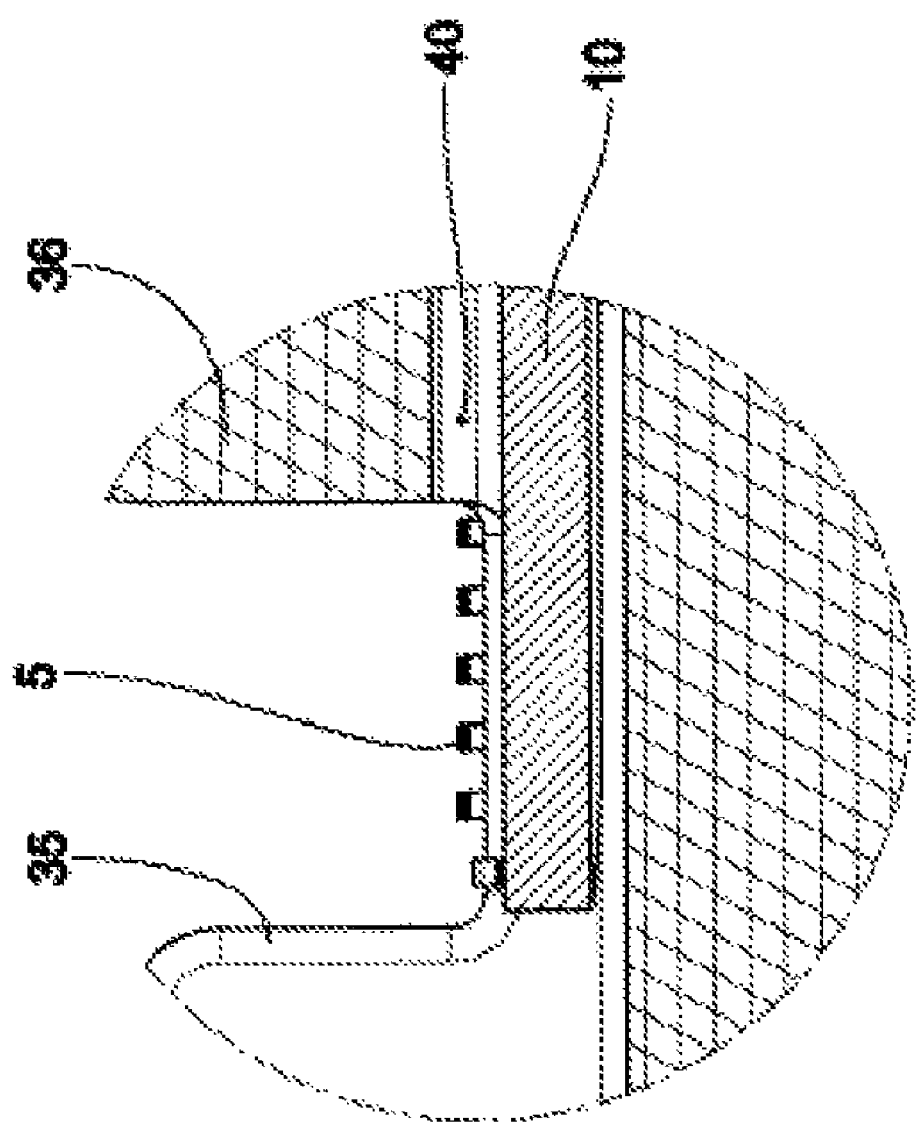
FIG. 12 shows in a sectional view the connection in the coil in the case of the exemplary embodiment according to FIG. 8.

FIG. 12 shows in an enlarged sectional view the connection of the first connection cable 10 arranged in a line recess 40. From FIG. 12 it is additionally evident that the first connection cable 10 and correspondingly also the second connection cable 11 are arranged in radial direction at a distance from the coil 5.

Figure 13:
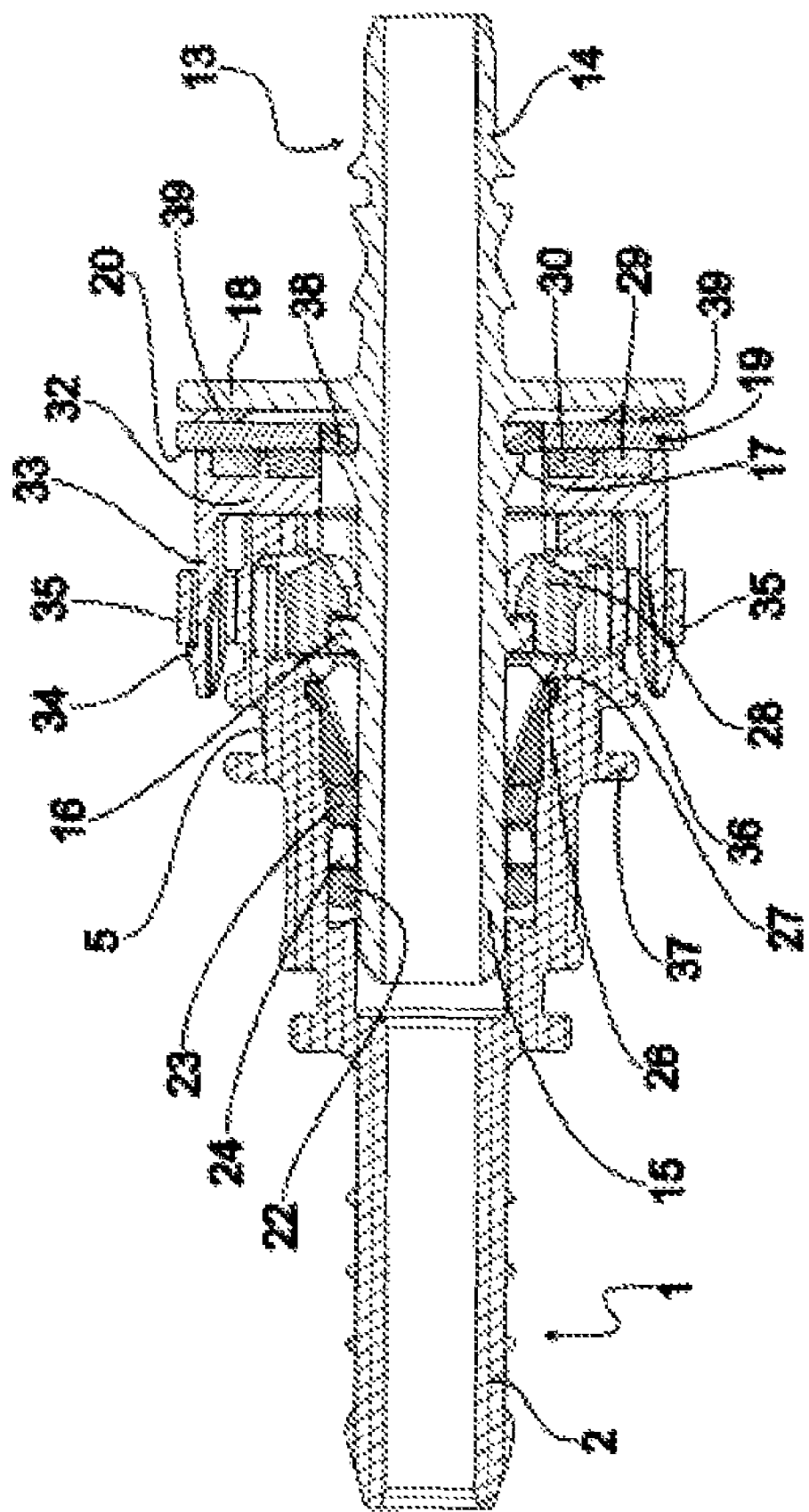
FIG. 13 shows in a longitudinal section the exemplary embodiment according to FIG. 8 with the inserted part in the closed position.

FIG. 13 shows in a longitudinal section the second exemplary embodiment according to FIG. 8 in the closed position of the inserted part 13 locked with the receiving part 1.

From FIG. 13 it is evident that in the case of the contact of the ring disk 32 on the retaining spring receiving body 6 the locking noses 34 configured on the slide-in tongues 33 engage the retaining bracket 35, so that the capacitor holder 31 is firmly mounted on the receiving part 1. In addition it can be inferred from the representation according to FIG. 13 that in the closed position of the inserted part 13 the outer pre-stress tongues 39 abut on the side of the counter plate 18 turned toward the receiving part 1 and the dielectric carrier disk 19 press in a gap-free manner with a pre-stress on the capacitor ring electrodes 29, 30. Due to the arrangement of the outer pre-stress tongues 39 in the radial outside region of the dielectric carrier disk 19 it is ensured that even in the case of deformations of the ring disk 32 said disk is subject to pre-stress in the region relevant for the sharp capacity escalation.

Figure 14:
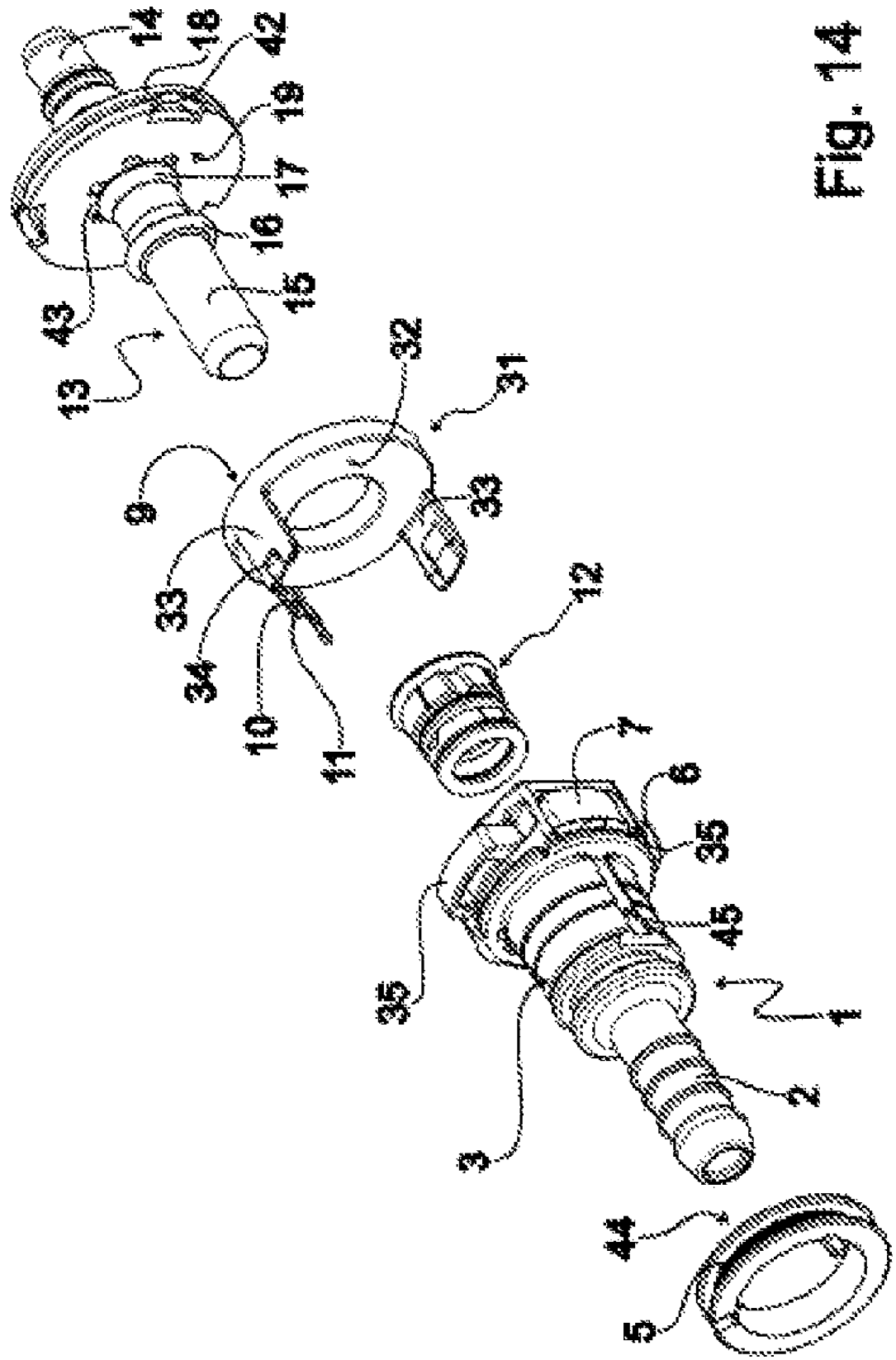
FIG. 14 shows in an exploded view in perspective a third exemplary embodiment of an inventive coupling with an inserted part, with a receiving part, with a capacitor holder as a separate component which can be attached to the receiving part as well as a separate coil body which can be attached to the receiving part.

FIG. 14 shows in an exploded view in perspective a third exemplary embodiment of an inventive coupling of fluid lines, wherein in the case of the first exemplary embodiment according to FIG. 1 through FIG. 7, in the case of the second exemplary embodiment according to FIG. 8 through FIG. 13 and in the case of the third exemplary embodiment matching elements are provided with the same reference numerals and will not be explained in closer detail in the following to avoid repetitions. In the case of the third exemplary embodiment according to FIG. 14 the dielectric carrier disk 19, in place of the outer pre-stress tongues 39 of the second exemplary embodiment, has gripping yokes 42 curved in the direction of the counter plate 18 and extending extensively over a recess in order to generate the pre-stress. In addition in the engagement region of the dielectric carrier disk 19 with the retaining collar 17 engagement strips 43 are configured extending in radial direction. As a result the dielectric carrier disk 19 can be arranged at a relatively great distance from the counter plate 18, in order to also compensate a relatively great crossing of the inserted part 13 for occupation of the closed position.

In addition the third exemplary embodiment according to FIG. 14 is configured with a coil body 44 as a separate component for receiving the coil 5, in order to keep the production of the coil 5 with a defined inductivity as simple as possible from a manufacturing process standpoint. A coil body guide groove 45 extending in longitudinal direction of the receiving part 1 is present for positioning of the coil body 44 on the receiving part 1, said coil body guide groove being introduced from the outside into the receiving section 3.

Figure 15:
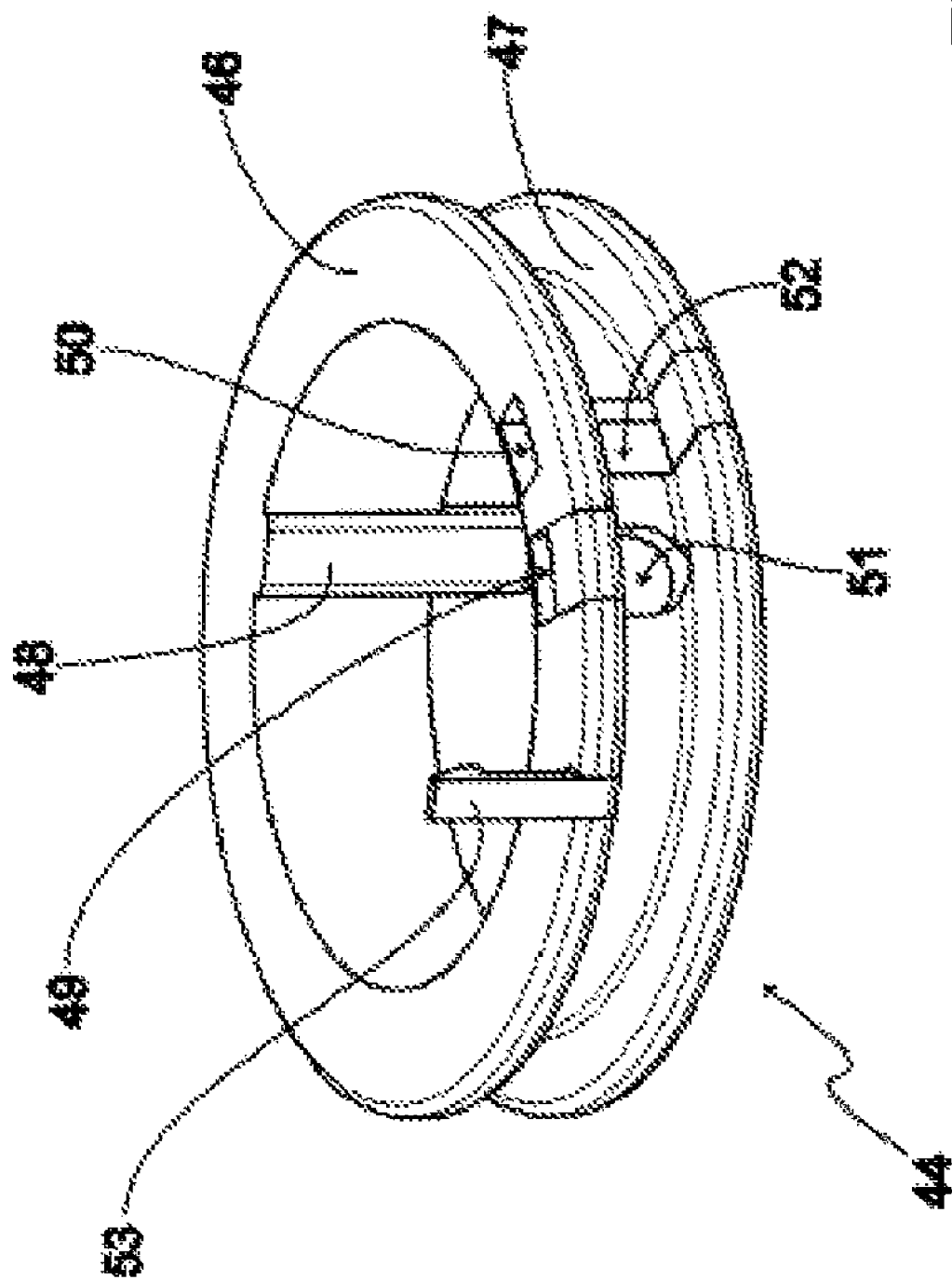
FIG. 15 shows in a perspective view the coil body in the case of the exemplary embodiment according to FIG. 14.

FIG. 15 shows the coil body 44 of the third exemplary embodiment according to FIG. 14. From FIG. 15 it can be recognized that the annular configured coil body 44 exhibits two border disks 46, 47, which encompass a receiving space provided for winding with the coil 5. In addition on the inside of the coil body 44 a guide projection 48 extending in longitudinal direction of the centerline of the coil body 44 is configured, said guide projection being configured complementary to the coil body guide groove 45, so that the coil body 44 is can be slipped onto the receiving section 3 of the receiving part 1 free from play.

For connection of a coil 5 wound up on the coil body 44 in addition insertion recesses 49, 50 are present in the coil body, said insertion recesses extending in extension of the line recesses 40, 41 introduced into the retaining spring receiving body 6, and receiving clearances 51, 52 attached thereto are configured, in which in combined arrangement the free ends of the connection cables 10, 11 are arranged. For locking of the coil body 44 on the retaining spring receiving body 6 of the receiving part 1 a fixing tongue 53 with a fixing nose pointing radially inward is present, which engages in an assigned complementary configured fixing recess in the retaining spring receiving body 6.

Figure 16:
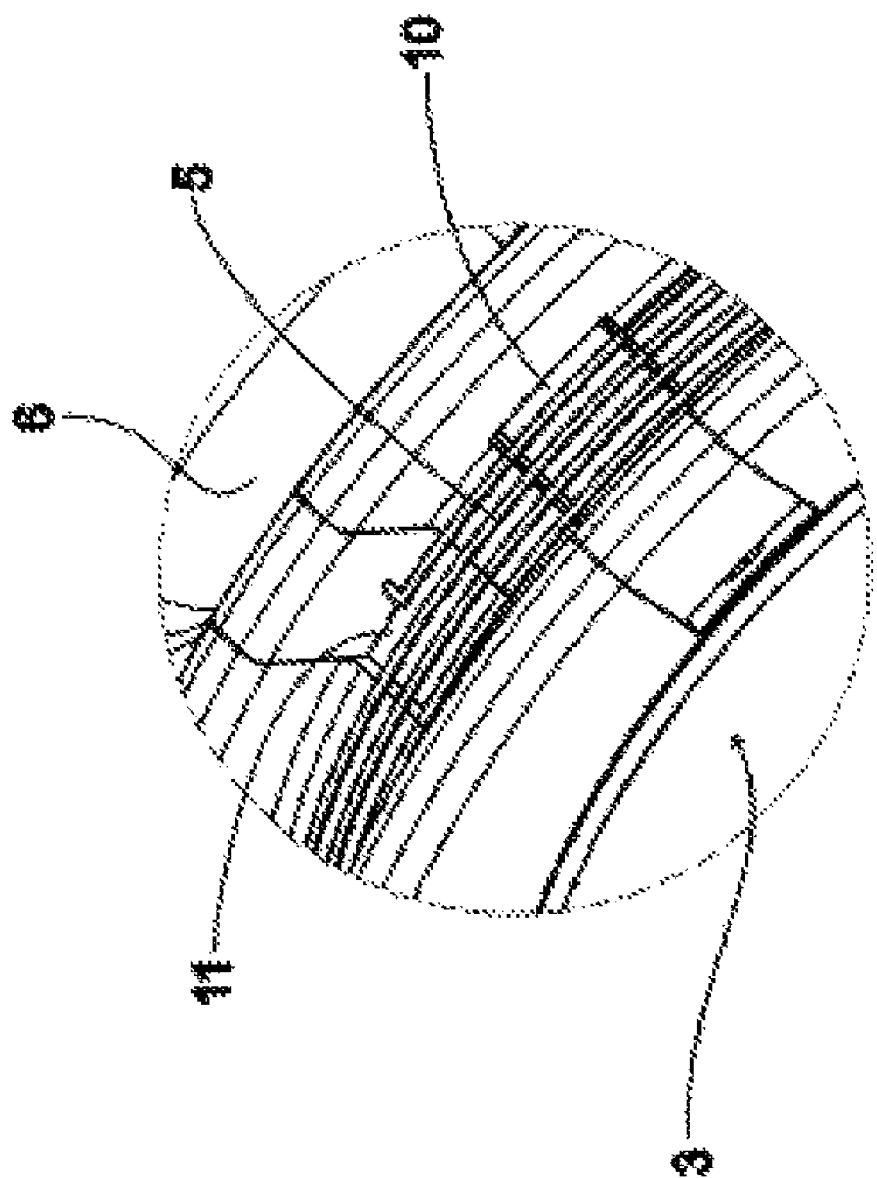
FIG. 16 shows in a detailed view in perspective the connection of the coil in the case of the exemplary embodiment according to FIG. 14.

FIG. 16 shows in an enlarged partial view in perspective the connection of the coil 5 arranged in the coil body 44 to the free ends of the connection cables 10, 11 lying in the receiving clearances 51, 52 in combined arrangement of the coupling according to the third exemplary embodiment.

Figure 17:
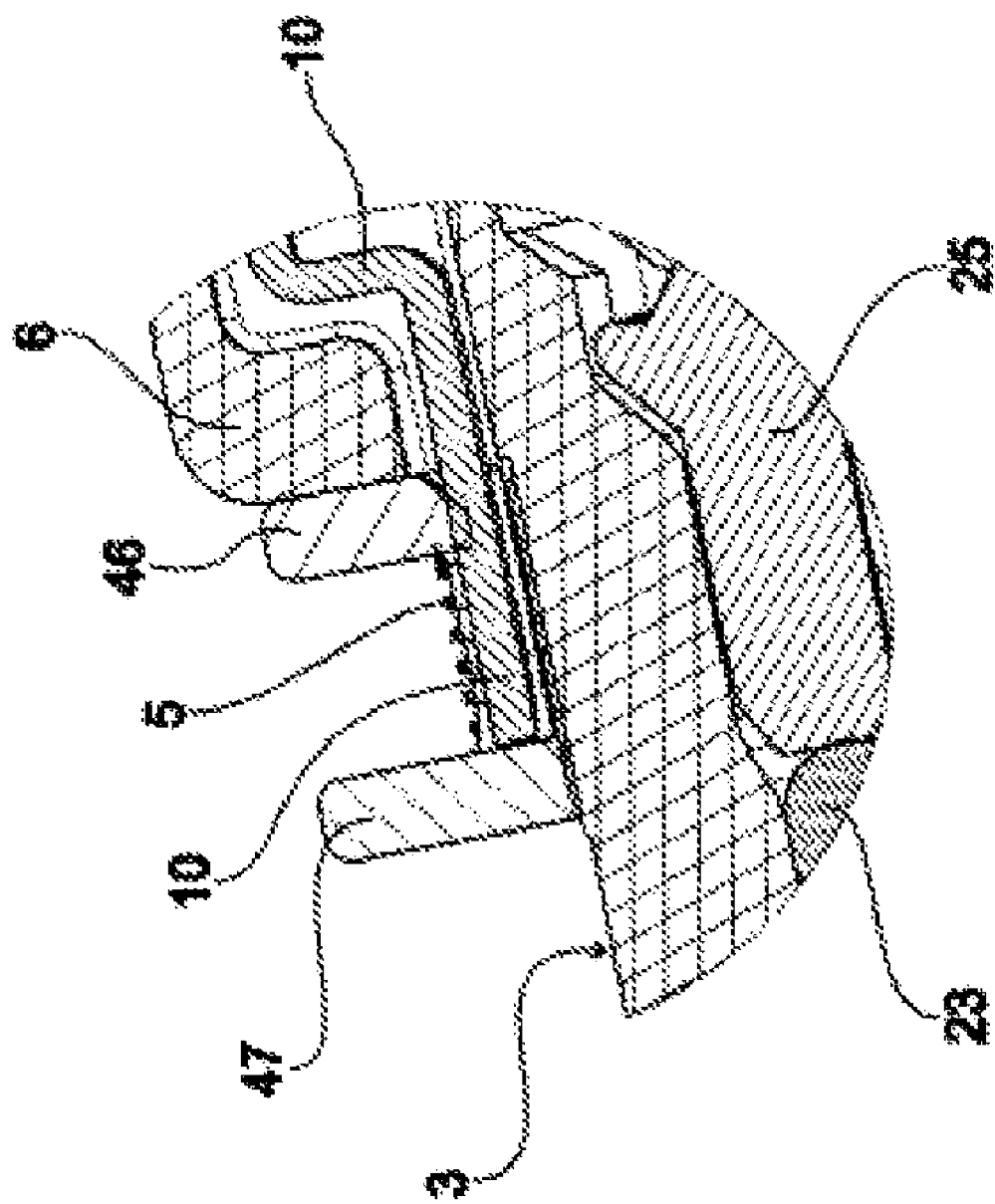
FIG. 17 shows in a detailed sectional view the connection of the coil in the case of the exemplary embodiment according to FIG. 14.

FIG. 17 shows in an enlarged detailed sectional view the coil body 44 slipped on with a certain clamping action onto the receiving section 3 of the receiving part with the connection of the coil 5 on the free end of the connection cable 10, which in the end region, as clearly shown in FIG. 17, is offset. Also in the case of the third exemplary embodiment the coil 5 is arranged in radial direction at a relatively great distance from the free ends of the connection cables 10, 11 in order to exclude a short circuit of the oscillating circuit.

Figure 18:
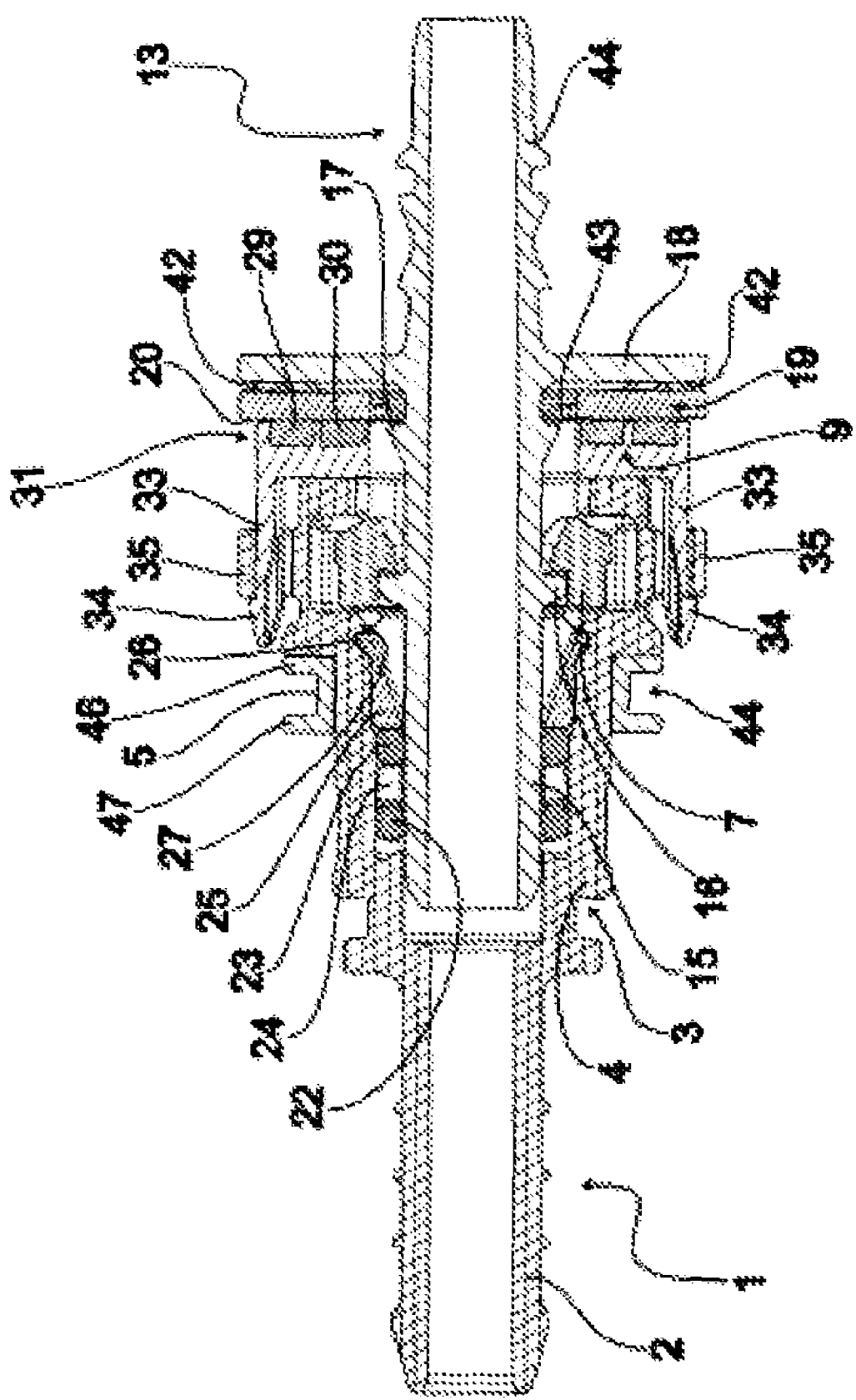
FIG. 18 shows in a longitudinal section the exemplary embodiment according to FIG. 14 with the inserted part in the closed position.

FIG. 18 shows in a longitudinal section the third exemplary embodiment with the inserted part 13 in the closed position. From FIG. 18 it is evident that in the closed position the engagement strips 43 are arranged at a distance from the locking collar 16 so that it is ensured that the pre-stress forces exerted by the gripping yokes 42 act completely on the capacitor ring electrodes 29, 30.

Figure 19:
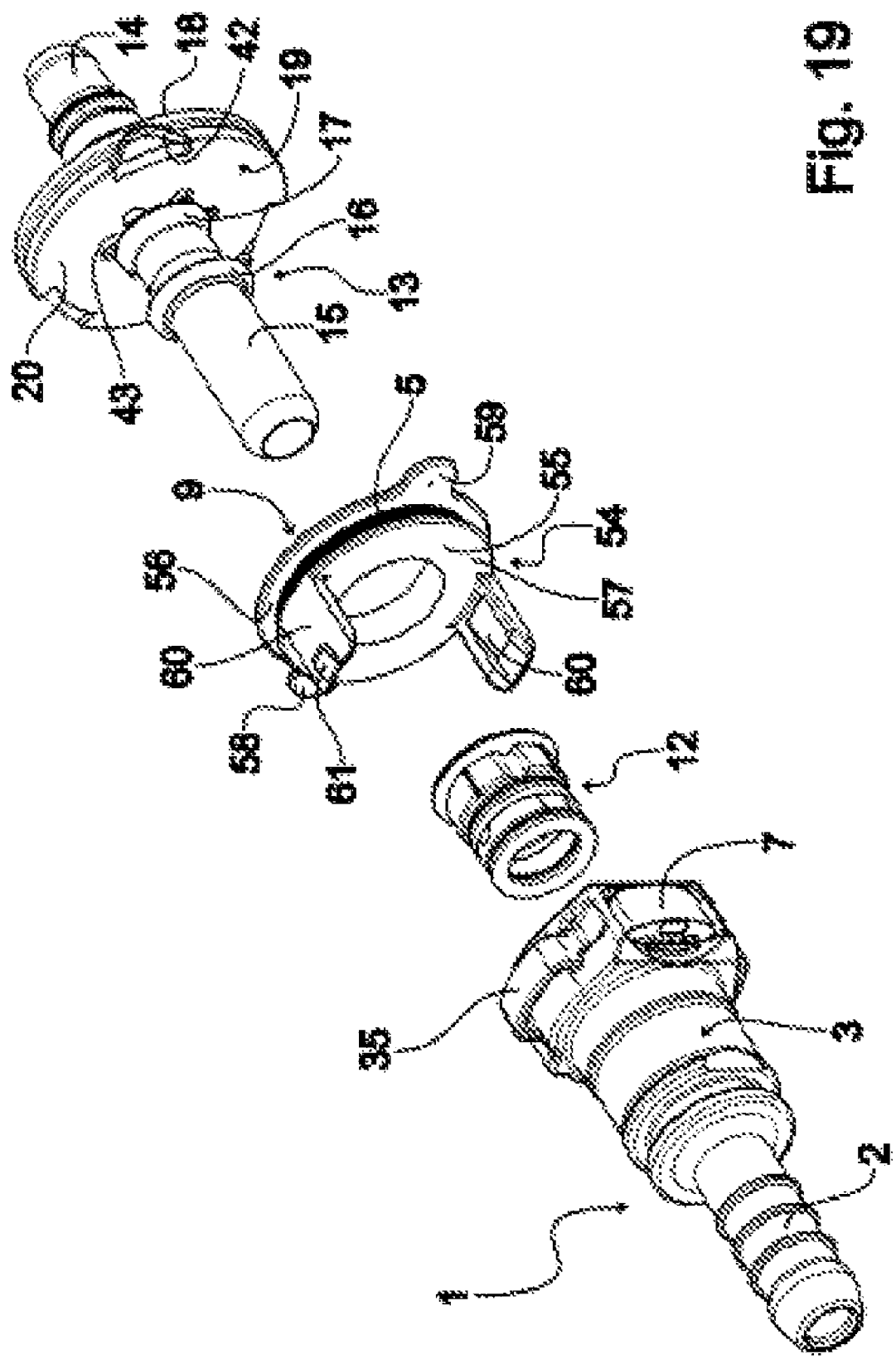
FIG. 19 shows in an exploded view in perspective a fourth exemplary embodiment of an inventive coupling with a receiving part, an inserted part and with an oscillating circuit carrier which can be attached to the receiving part.

FIG. 19 shows in an exploded view in perspective a fourth exemplary embodiment of an inventive coupling for a fluid line not shown in FIG. 19, wherein in the case of the first exemplary embodiment according to FIG. 1 through FIG. 7, in the case of the second exemplary embodiment according to FIG. 8 through FIG. 13, in the case of the third exemplary embodiment according to FIG. 14 through FIG. 18 and in the case of the fourth exemplary embodiment matching elements are provided with the same reference numerals and in the following will not be more closely described. The fourth exemplary embodiment according to FIG. 19 has an oscillating circuit carrier 54 which exhibits a ring disk 55 configured with a central recess, said ring disk being configured at its radial outside with a front locking collar 56 with great diameter and with a rear locking collar 57 with a lower diameter in comparison to the diameter of the front locking collar 56, said locking collars encompassing a receiving groove for a coil 5 of an electric oscillating circuit.

On the front locking collar 56 diametrically opposed capacitor connections 58, 59 are configured, which exhibit in the center a small recess for through-connection to a free end of the coil 5. On the side opposite the front locking collar 56 the oscillating circuit carrier 54 corresponding to the second exemplary embodiment and the third exemplary embodiment is configured with slide-in tongues 60, said slide-in tongues each being configured on their free ends pointing away from the ring disk 55 with a locking nose 61 for engagement of a retaining bracket 35.

Figure 20:
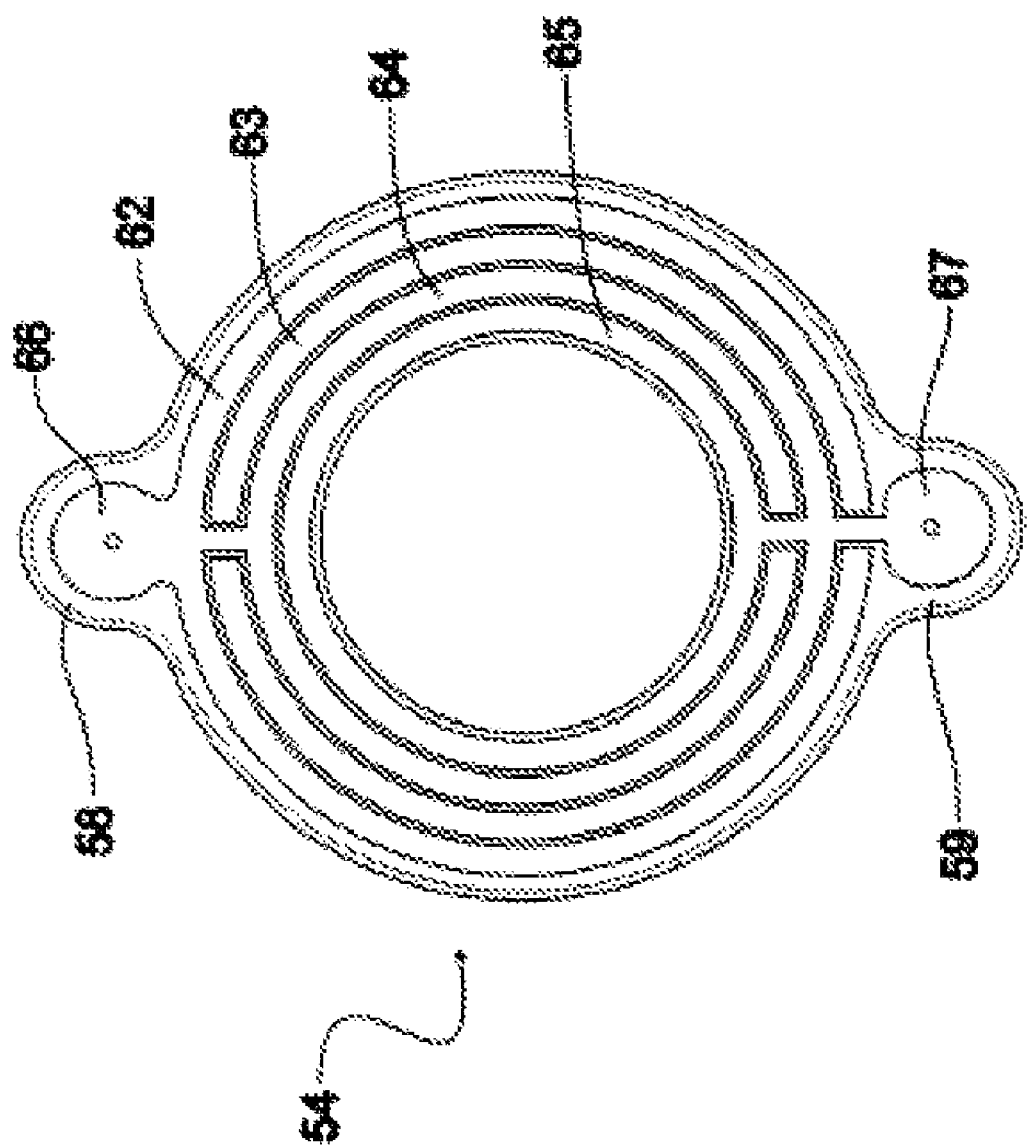
FIG. 20 shows a front view of the oscillating circuit carrier in the case of the exemplary embodiment according to FIG. 19.

FIG. 20 shows the oscillating circuit carrier 54 of the third exemplary embodiment according to FIG. 19 in a view of the front locking collar 56. From FIG. 20 it is evident that a capacitor 9 of the electric oscillating circuit in the case of the fourth exemplary embodiment is formed via two pairs of capacitor ring electrodes 62, 63, 64, 65 lying on a plane to one another, wherein the outermost capacitor ring electrode 62 as well as one central outer capacitor ring electrode 64 are interconnected on a first connection region 66 and one central outer capacitor ring electrode 63 and one innermost capacitor ring electrode 65 are interconnected on a second connection region 67. The connection regions 66, 67 are each configured in the region of a capacitor connection 58, 59. Through the interleaving of the capacitor ring electrodes 62, 63, 64, 65 an inhomogeneous electric field division in longitudinal division that is very sensitive to capacity changes, corresponding to the foregoing explained exemplary embodiments, is produced.

Of course, in the case of modifications another number of nested capacitor ring electrodes can also be configured in order to provide a specific capacity.

Figure 21:
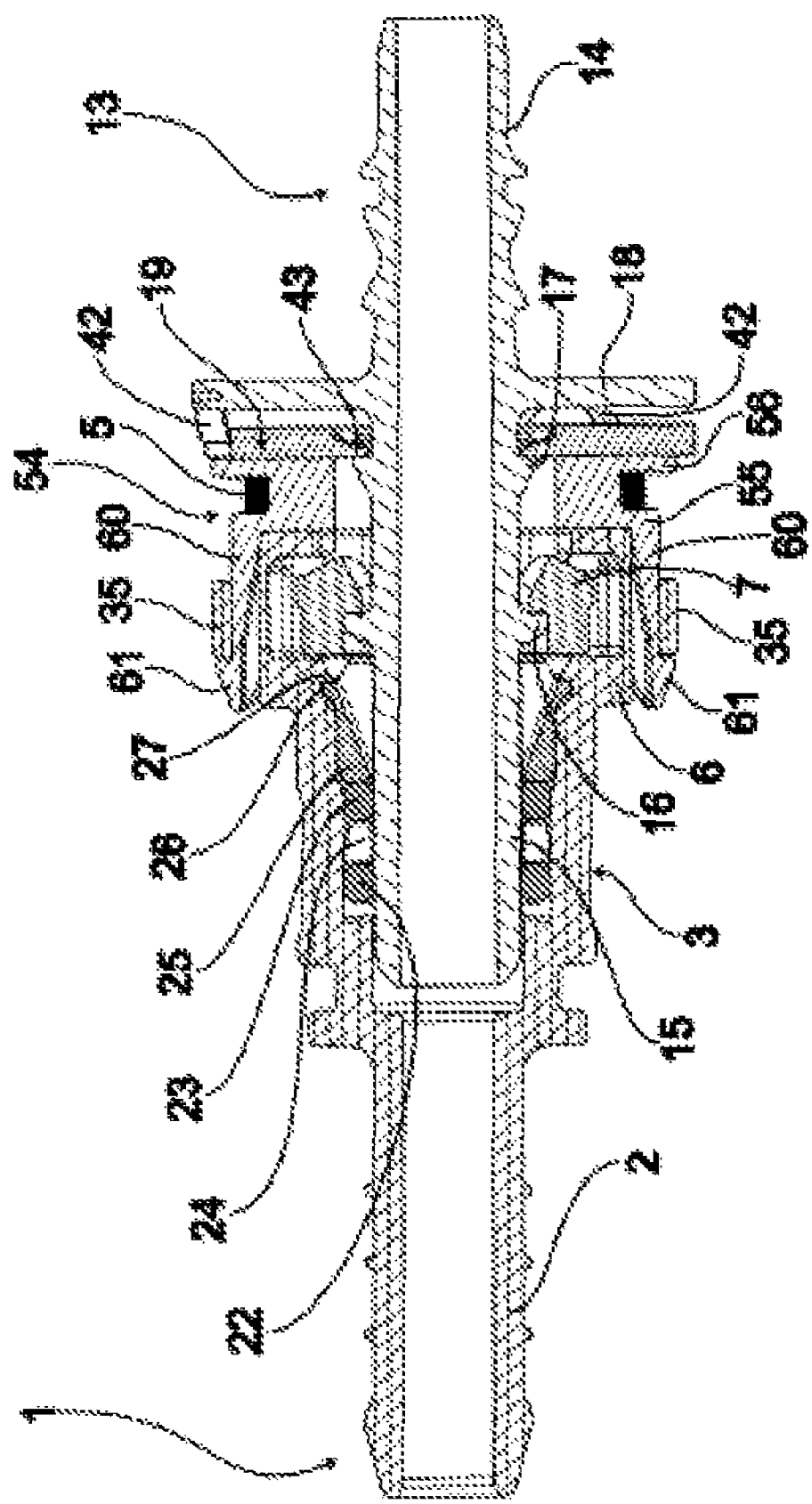
FIG. 21 shows in a longitudinal section the exemplary embodiment according to FIG. 19 with the inserted part in the closed position.

FIG. 21 shows in a longitudinal section the coupling according to the fourth exemplary embodiment according to FIG. 19 and FIG. 20 in combined arrangement with the inserted part 13 in the closed position, in which it is locked with the receiving part 1. From FIG. 21 it is evident that through the integration of the coil 5 and the capacitor 9 of the electric oscillating circuit in the oscillating circuit carrier 54 a compact design and in particular also a relatively simple retrofitability of receiving parts 1 arises, for example when the electric oscillating circuit no longer properly functions due to line defects.

Figure 22:
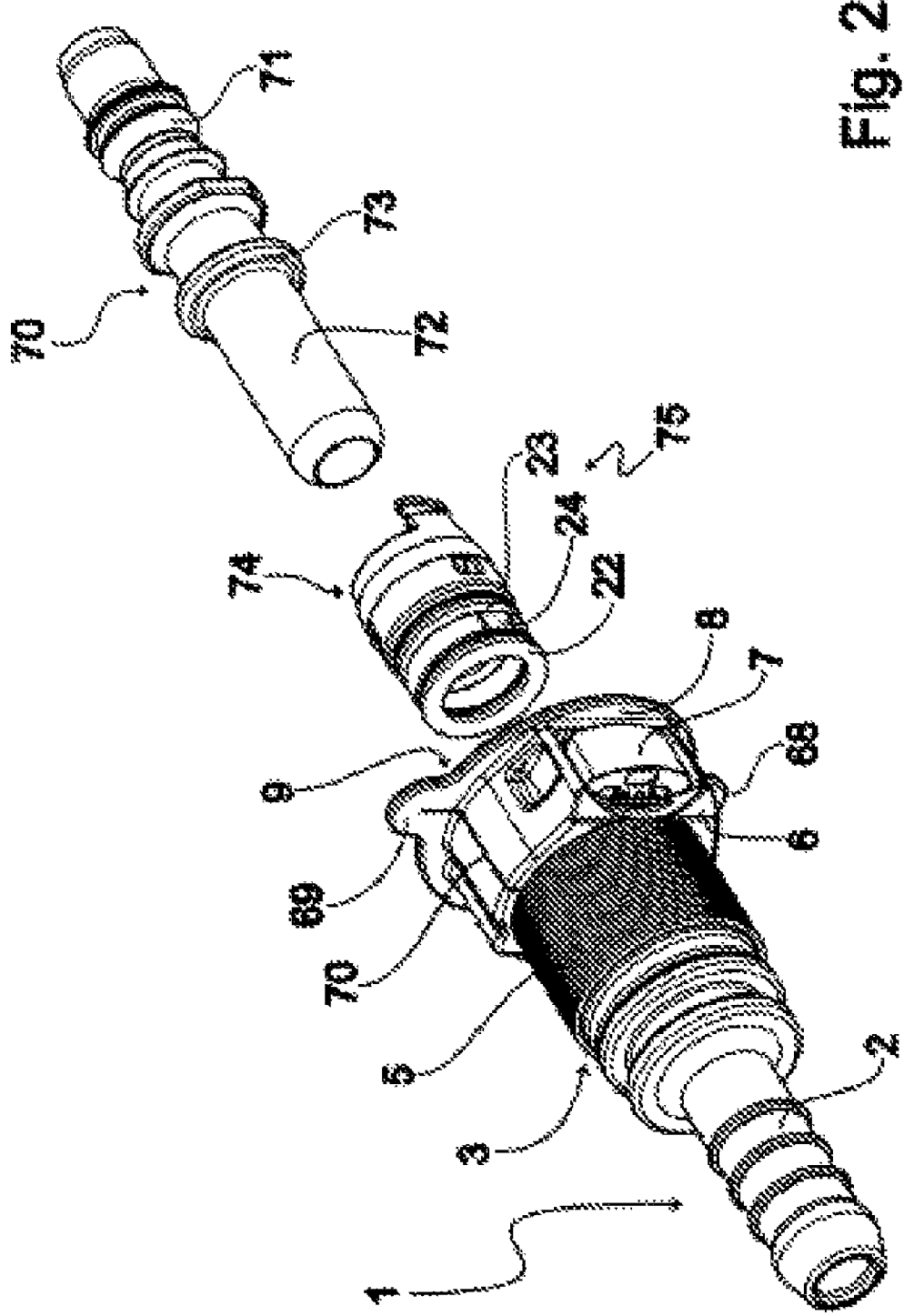
FIG. 22 shows in an exploded view in perspective a fifth exemplary embodiment of an inventive coupling with a receiving part, an inserted part and with a coil core unit.

FIG. 22 shows in an exploded view in perspective a fifth exemplary embodiment of an inventive coupling with a fluid line not shown in FIG. 22, wherein in the case of the first exemplary embodiment according to FIG. 1 through FIG. 7, in the case of the second exemplary embodiment according to FIG. 8 through FIG. 13, in the case of the third exemplary embodiment according to FIG. 14 through FIG. 18, in the case of the fourth exemplary embodiment according to FIG. 19 through FIG. 21 and the fifth exemplary embodiment matching elements are provided with the same reference numerals and will not be explained in closer detail in the following to avoid repetitions. From FIG. 22 it is evident that the receiving part 1 of the fifth exemplary embodiment is essentially built like the receiving part 1 of the first exemplary embodiment, wherein in the case of the fifth exemplary embodiment however the coil 5 is wound with a relatively thick coil wire and the winding wall 4 is essentially completely occupied. On the capacitor carrier plate 8 of the fifth exemplary embodiment capacitor connections 68, 69 are configured which are arranged diametrically opposed to one another and are each electrically connected to a free end 70, 71 of the coil 5 to configure an electric oscillating circuit.

The inserted part 70 of the coupling according to the fifth exemplary embodiment exhibits in deviation from the inserted parts 13 according to the previously explained exemplary embodiments as in conjunction with elements relevant to the invention only one connection nozzle 71, an insertion shaft 72 opposite the connection nozzle 71 and a locking collar 73.

The fifth exemplary embodiment has as an element of a tuning device a permeability switching unit 74, which together with a sealing unit 75 built of a first sealing ring 22, a second sealing ring 23 as well as an intermediate ring 24 arranged between sealing rings 22, 23 can be inserted into the receiving part 1.

Figure 23:
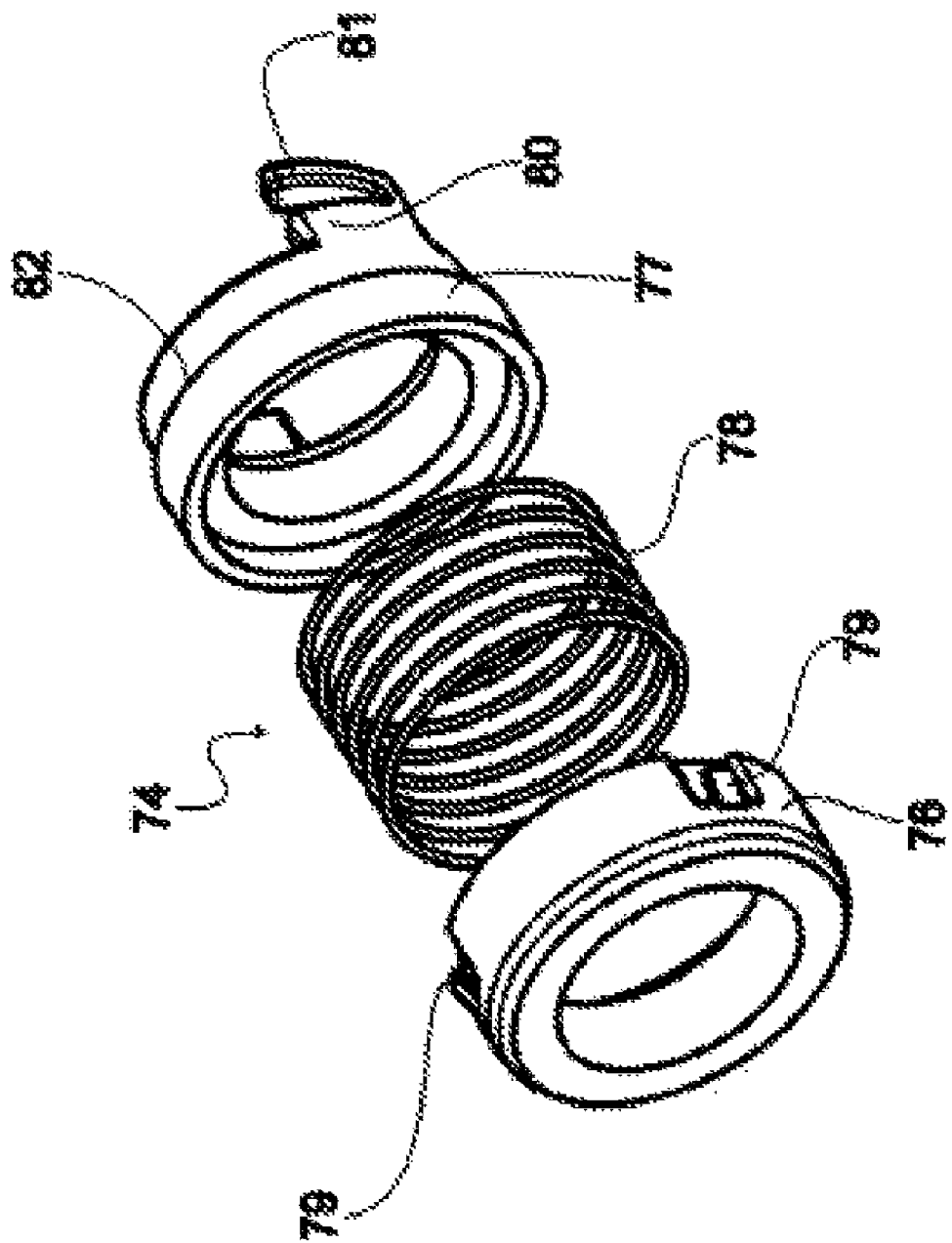
FIG. 23 shows in an exploded view in perspective the coil core unit of the exemplary embodiment according to FIG. 22.

FIG. 23 shows in an exploded view in perspective the permeability switching unit 74 of the fifth exemplary embodiment according to FIG. 22. The permeability switching unit 74 exhibits a first coil core part 76 turned toward the second sealing ring 23 and a second coil core part 77 averted from the sealing unit 75, each coil core part being manufactured of a material with a high permeability rate. Each coil core unit 76, 77 exhibits a central recess for feeding through of the insertion shaft 72 and is equipped with a radial externally configured receiving space, in which the front ends of a compression spring 78 are arranged, which within the scope of their spring action press the coil core parts 76, 77 away from each other.

In addition it can be inferred from the representation according to FIG. 23 that on the first coil core part 76 locking tongues 79 exposed radially outward pointing away from the sealing unit 75 are configured, in order to fix the first coil core part 76 together with the sealing rings 22, 23 as well as the intermediate ring 24 after insertion in the receiving part 1.

The second coil core part 77 has driver tongues 80 in longitudinal direction pointing away from the first coil core part 76, at whose free ends as a counter-pressure spring a spring tongue 81 extending in circumferential direction as well as exposed in longitudinal direction is configured. The spring tongues 81 are harder together vis-à-vis the compression spring 78. In addition the second coil core part 77 is provided with a stop wall 82 extending at a right angle to the longitudinal direction.

Figure 24:
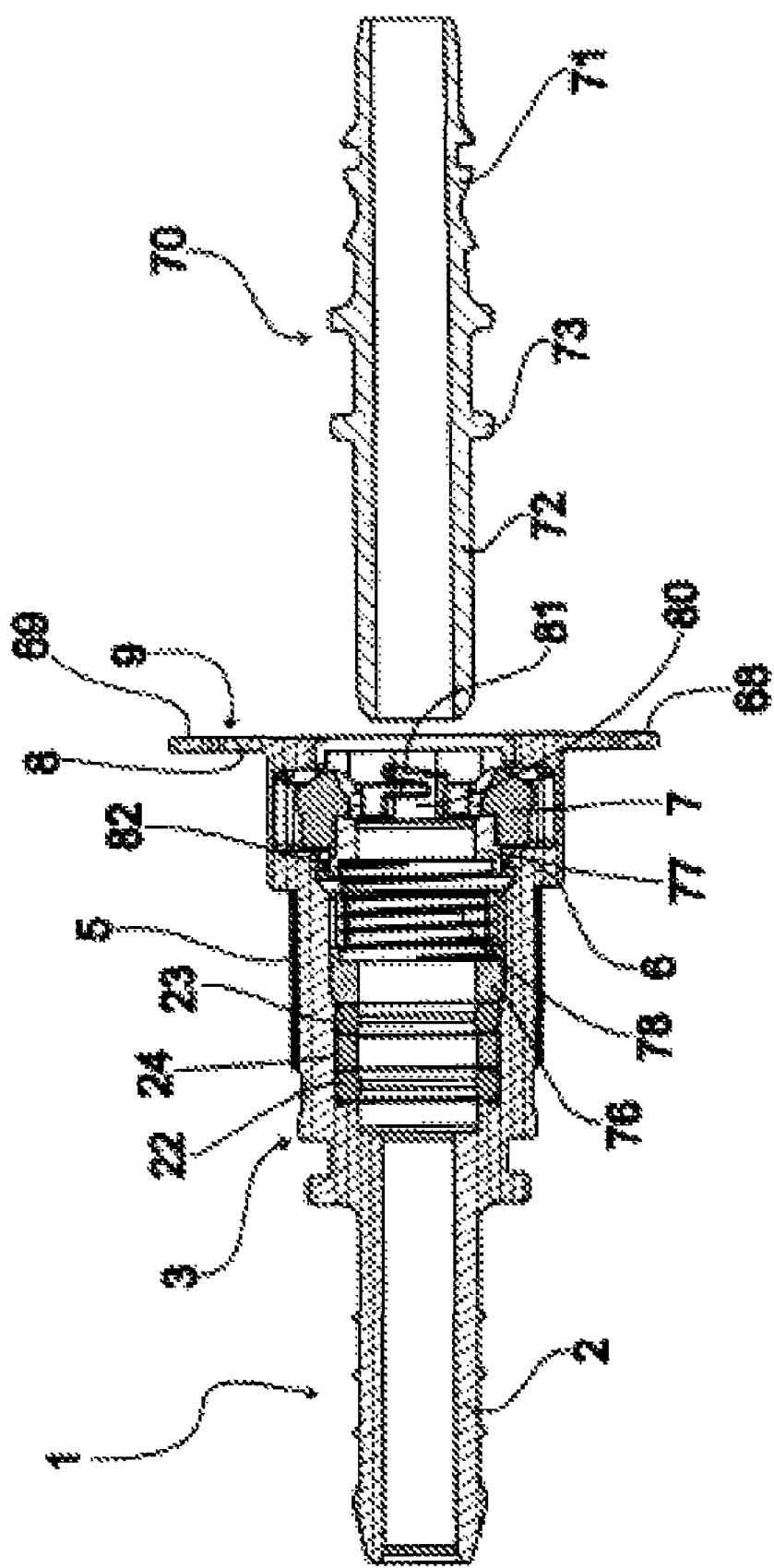
FIG. 24 shows the exemplary embodiment according to FIG. 22 with a coil core unit inserted into the receiving part and with the inserted part prior to insertion into the receiving part.

FIG. 24 shows in a longitudinal section the fifth exemplary embodiment according to FIG. 22 in an arrangement in which the inserted part 70 is arranged in an intermediate position, here outside of the receiving part 1, wherein the sealing unit 75 and the permeability switching unit 74 are arranged in the receiving part 1. From the representation according to FIG. 24 it is evident that the compression spring 78 keeps the coil core parts 76, 77 at a distance from each other, wherein the second coil core part 77 hits the stop wall 82 on the retaining spring 7, so that the permeability switching unit 74 is anchored in the receiving part 1.

Figure 25:
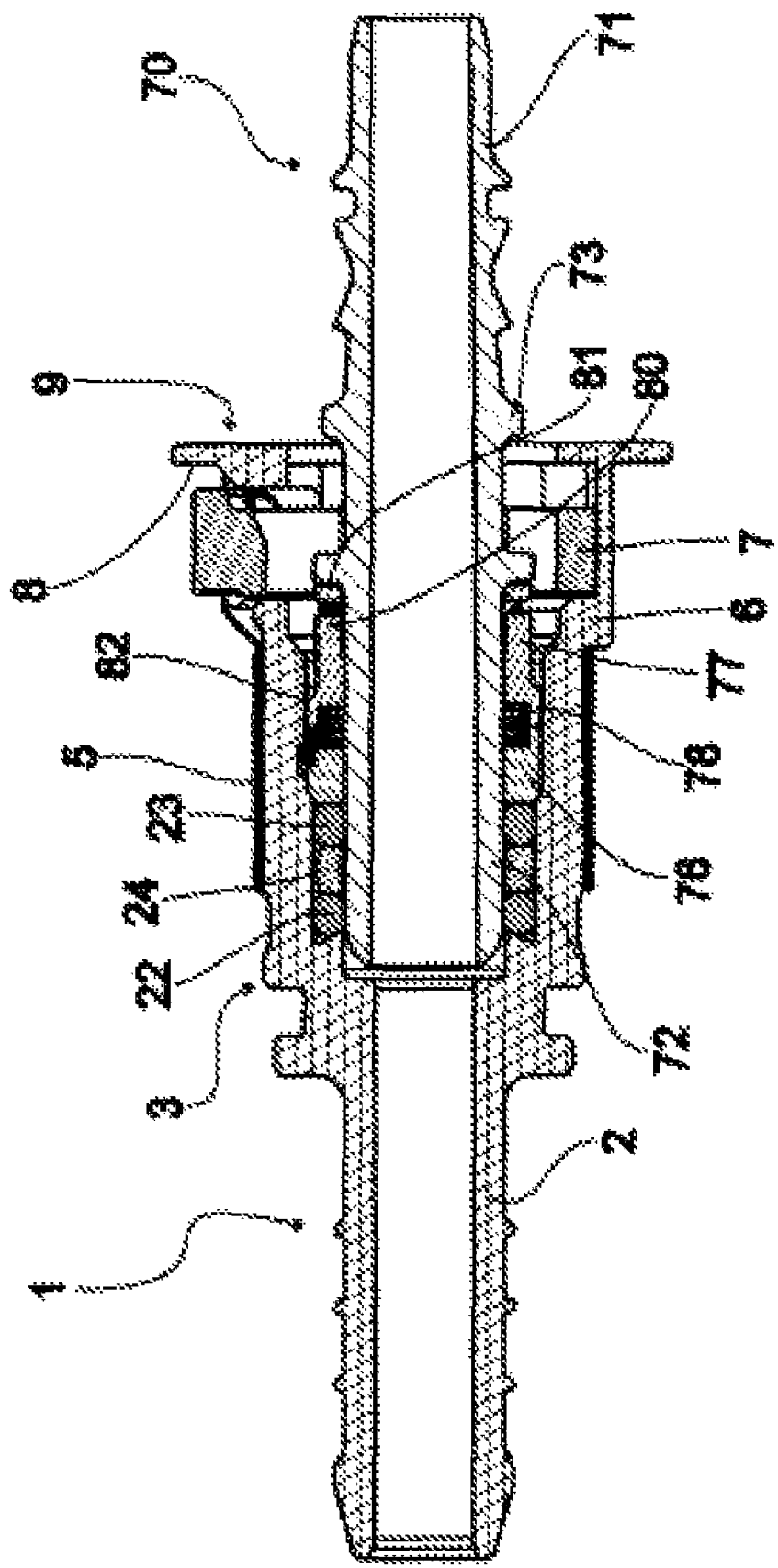
FIG. 25 shows in a longitudinal section the exemplary embodiment according to FIG. 22 with the inserted part in the closed position.

FIG. 25 shows in a longitudinal section the fifth exemplary embodiment according to FIG. 22 with the inserted part 70 in the closed position, in which the rear snap-on tongues 28 of the retaining spring 7 engage the ring collar 73.

In this arrangement the spring tongues 81 not shown in the representation according to FIG. 25 lie on the locking collar 73 and press on the basis of their higher spring action vis-à-vis the compression spring 78 the coil core parts 76, 77 away from one another free of gaps. As a result the permeability of the permeability switching unit 74 with a closure permeability value as well as in succession the inductivity of the coil 5 with a closure capacity value are maximum and the resonant frequency of the electric oscillating circuit is tuned to the characteristic closure frequency.

Figure 26:
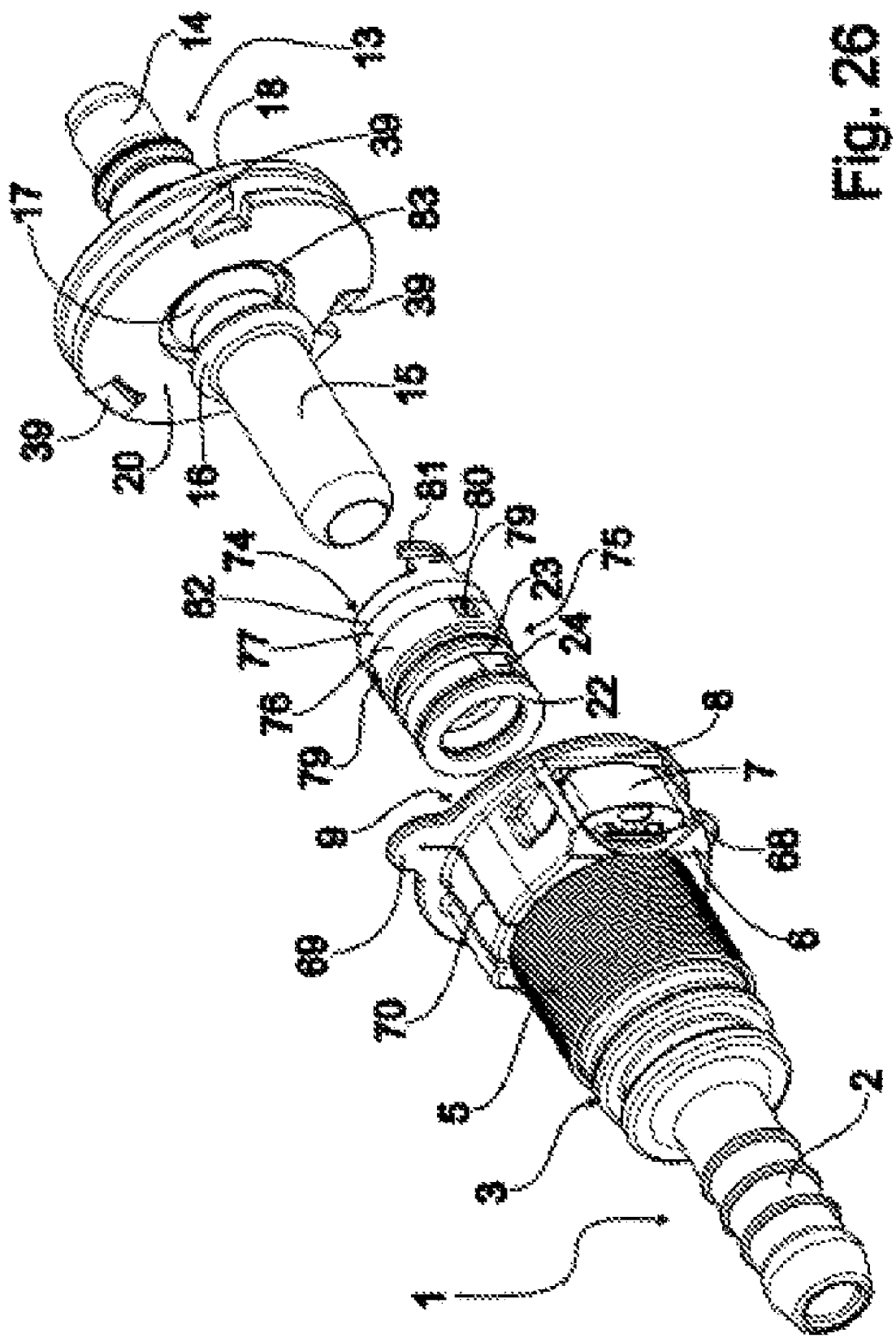
FIG. 26 shows in an exploded view in perspective a sixth exemplary embodiment of an inventive coupling with a receiving part, an inserted part, with a dielectric carrier disk as well as with a coil core unit.

FIG. 26 shows in an exploded view in perspective a sixth exemplary embodiment of an inventive coupling with a fluid line not shown in FIG. 26, wherein in the case of the first exemplary embodiment according to FIG. 1 through FIG. 7, in the case of the second exemplary embodiment according to FIG. 8 through FIG. 13, in the case of the third exemplary embodiment according to FIG. 14 through FIG. 18, in the case of the fourth exemplary embodiment according to FIG. 19 through FIG. 21, in the case of the fifth exemplary embodiment according to FIG. 22 through FIG. 25 and in the case of the sixth exemplary embodiment matching elements are provided with the same reference numerals and will not be explained in closer detail in the following to avoid repetitions. The sixth exemplary embodiment has a receiving part 1, a coil 5, a capacitor 9, a permeability switching unit 74 and a sealing unit 75, which are built in accordance with the fifth exemplary embodiment.

The inserted part 13 is, in the case of the sixth exemplary embodiment essentially designed like the inserted part 13 in the case of the second exemplary embodiment with a dielectric carrier disk 19, wherein in the case of the sixth exemplary embodiment however inner short pre-stress tongues 83 are present, which are arranged between the retaining collar 17 and the locking collar 16 as well as being set pointing in the direction of the counter plate 18.

Figure 27:
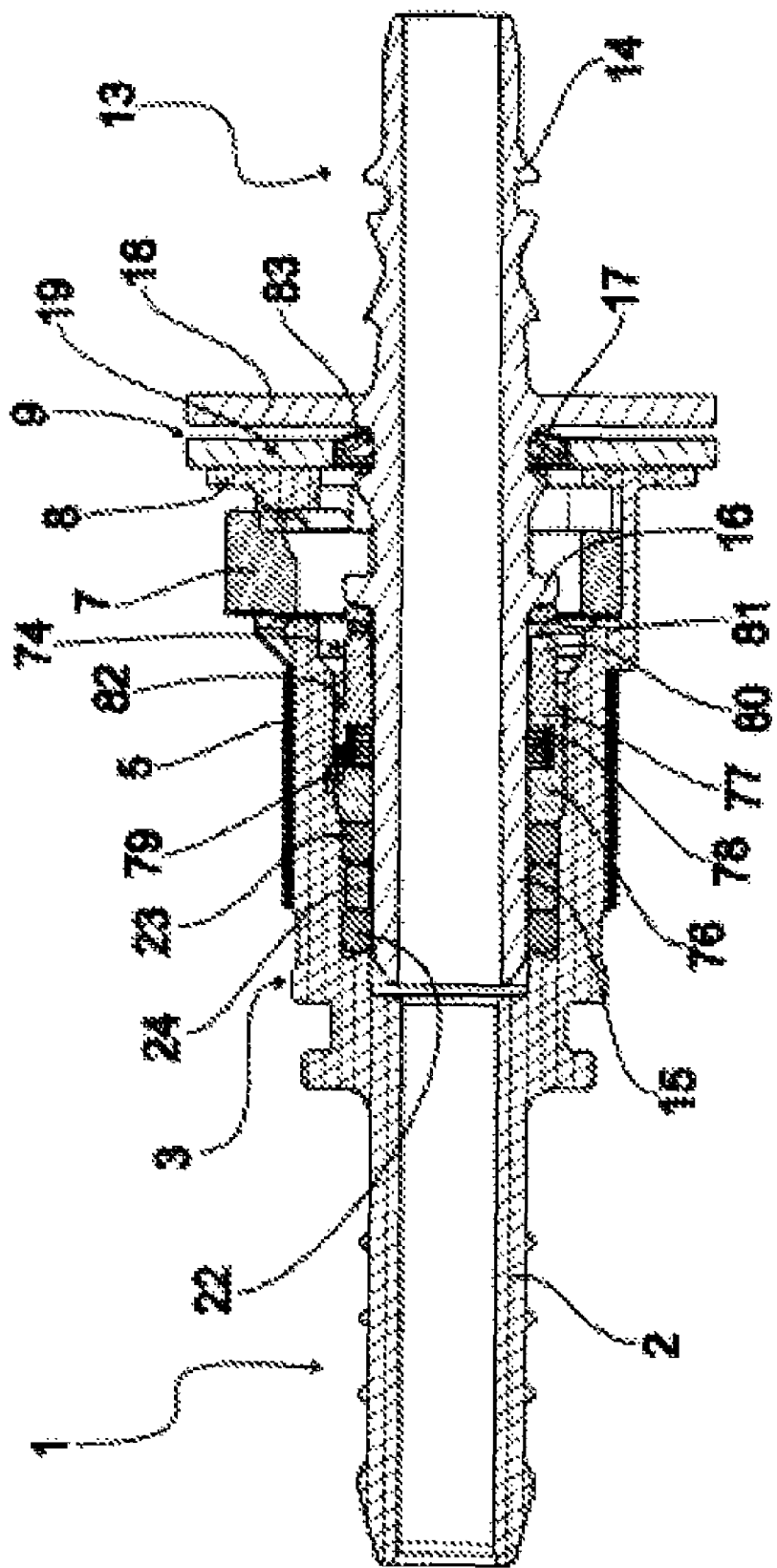
FIG. 27 shows in a longitudinal section the exemplary embodiment according to FIG. 26 with the inserted part in the closed position.

FIG. 27 shows the sixth exemplary embodiment with the inserted part 13 in the closed position, in which the locking collar 16 is engaged by the rear snap-on tongues 28 not shown in the representation according to FIG. 23 and which presses against the spring tongues 81 of the second coil core part 77. Simultaneously the dielectric carrier disk 19 rests on the capacitor carrier plate 8, so that in the case of the sixth exemplary embodiment in the closed position the inductivity of the coil 5 as well as the capacity of the capacitor 9 are maximum. As a result an especially pronounced, sharp change of the resonant frequency of the electric oscillating circuit to the characteristic closure frequency arises vis-à-vis the intermediate positions.

In the case of an exemplary embodiment not shown an inserted part is configured at least with a section of a material with a high permeability, so that in the case of the insertion of the inserted part into the receiving part provided with an inductivity and a capacity for the provision of a permanently closed oscillating circuit the resonant frequency of the oscillating circuit changes in correspondence to the principles of the previously explained exemplary embodiments.

Figure 28:
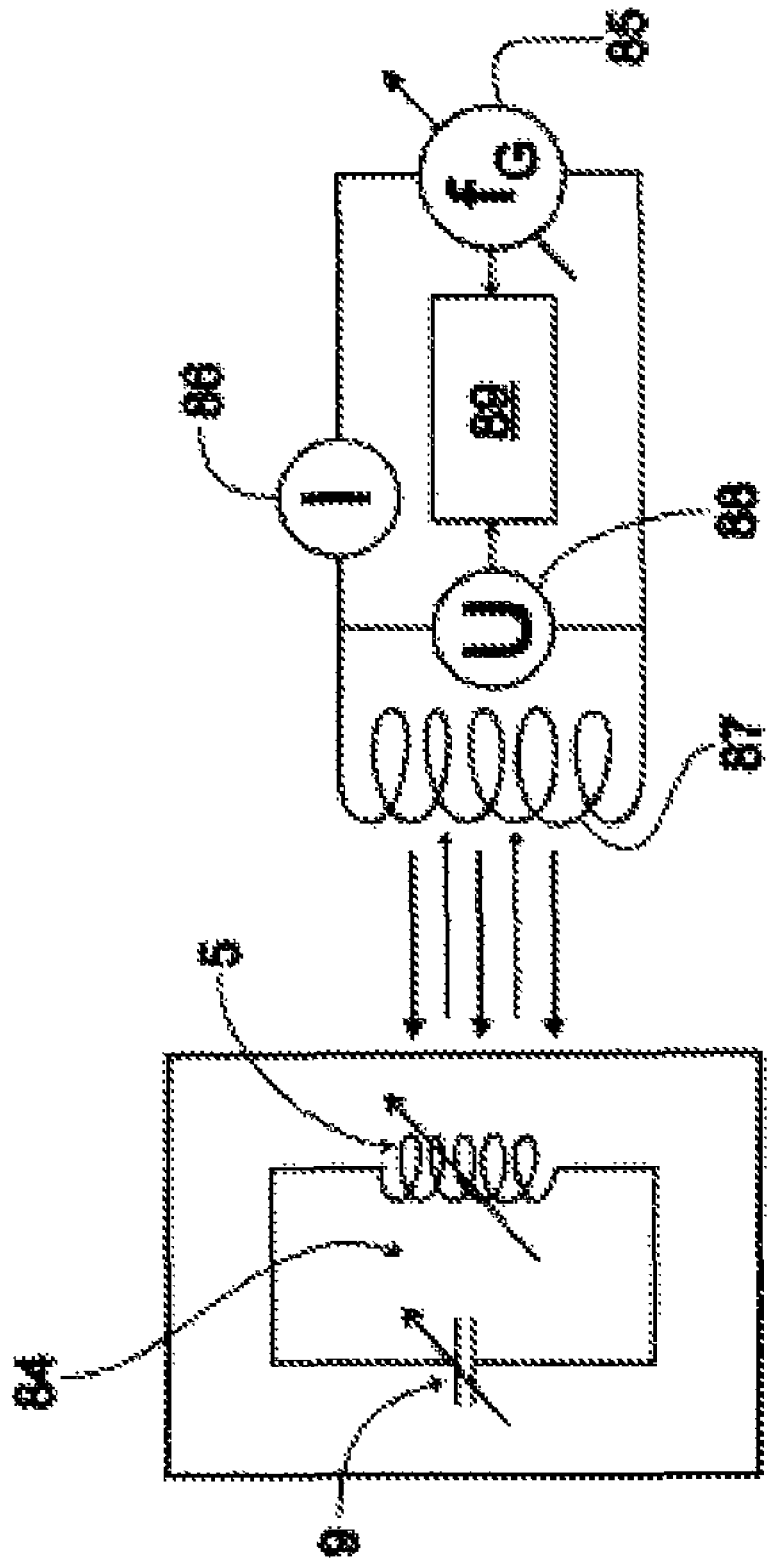
FIG. 28 shows in a block diagram a circuit arrangement for the supplying of an inventive coupling with electromagnetic energy in the form of an exciter field as well as for the detection and processing of the attenuations of the exciter field brought about by the inventive couplings.

FIG. 28 shows in a block diagram a circuit arrangement for supplying an inventive coupling with electromagnetic energy in the form of an exciter field as well as for detecting the attenuation of the exciter field through the permanently closed oscillating circuit 84 present in the case of the inventive couplings, said oscillating circuit being formed from the coil 5 and the capacitor 9 with electromagnetic properties that can be changed individually or in combination for changing the resonant frequency of the oscillating circuit 84. The circuit arrangement according to FIG. 28 has a frequency generator 85 with an adjustable excitation frequency $f_G$, which is shunted to a measuring coil 87. In addition a voltage measuring unit 88 is shunted to the measuring coil 87. An output signal of the frequency generator 85 characteristic for the excitation frequency $f_G$ as well as a characteristic output signal of the voltage measuring unit 88 for the measured voltage on the measuring coil 87 can be fed to an evaluation unit 89.

In the case of the supplying of the measuring coil 87 with an excitation frequency $f_G$, said excitation frequency emits, as indicated by bold arrows pointing from the measuring coil 87 in the direction of the coil 5 of the oscillating circuit 84, an electromagnetic exciter field which couples in the coil 5 of the oscillating circuit 84 and excites the oscillating circuit 84 itself to an oscillation. If the excitation frequency $f_G$ lies in the region of a resonant frequency of the oscillating circuit 84, a voltage drop can be measured via a feedback mechanism in the voltage measuring unit 88 symbolized by less bold arrows pointing from the coil 5 of the oscillating circuit 84 in the direction of the measuring coil 87 due to the attenuation of the exciter field. If the voltage drop lies at a characteristic closure frequency characteristic for the closed position of the inventive coupling, the closed state of the relevant coupling is detected without contact.

Thus far it can be recognized without further ado that in the case of the tuning of the oscillating circuit 84 of several inventive couplings to different characteristic closure frequencies the closed state of these couplings can be detected virtually simultaneously.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:
1. A coupling for a fluid line, comprising:
an inserted part;
a receiving part structured for locking receipt of the inserted part in a closed position, the receiving part including an permanently closed electric oscillating circuit which exhibits a specific resonant frequency in the closed position responsive to the supply of electromagnetic energy for oscillation, said resonant frequency corresponding to a characteristic closure frequency; and said inserted part including a tuning device cooperating with the oscillating circuit whereby the oscillating circuit, when positioned in an intermediate position of the inserted part deviating from the closed position, exhibits a resonant frequency deviating from the characteristic closure frequency.

2. The coupling of claim 1, wherein the tuning device acts on the capacity of the oscillating circuit.

3. The coupling of claim 2, wherein the electric oscillating circuit includes a capacitor carrier plate arranged on a front side of the receiving part and which encompasses an insertion opening for feeding through of the insertion part.

4. The coupling of claim 3, wherein the capacitor carrier plate includes a number of ring electrodes lying concentrically interlocked with each other and arranged on a plane.

5. The coupling of claim 4, wherein the tuning device includes a dielectric carrier disk mounted on the inserted part and which, in the closed position of the inserted part, abuts the capacitor plate so that the capacitor exhibits a closure capacity value in the closed position of the inserted part and in intermediate positions of the inserted part exhibits an intermediate capacity value different from the closure capacity value.

6. The coupling of claim 5, further comprising pre-stress means configured on the dielectric carrier disk which, in the closed position of the inserted part, press the dielectric carrier disk with a pre-stress force against the capacitor carrier plate.

7. The coupling of claim 1, wherein the tuning device acts on the inductivity of the electric oscillating circuit.

8. The coupling of claim 7, wherein the tuning device includes a permeability switching unit which cooperates with the inserted part and, in the closed position of the inserted part, exhibits a closure permeability value and in intermediate positions of the inserted part exhibits an intermediate permeability value differing from the closure permeability value.

9. The coupling of claim 8, wherein the permeability switching unit includes two coil core parts which, in the closed position, lie against one another and between which a gap is configured in each intermediate position.

10. The coupling of claim 9, further comprising a compression spring arranged between the coil core parts.

11. The coupling of claim 10, further comprising a counter-pressure spring between the inserted part and a coil body part, said counter-pressure spring acting against the pressure of the compression spring such that, in the case of the arrangement of the inserted part in the closed position, the coil core parts contact one another.

* * * * *